US011293776B2

(12) United States Patent
Fitchett

(10) Patent No.: US 11,293,776 B2
(45) Date of Patent: Apr. 5, 2022

(54) SMART GEOCODING OF ROAD INTERSECTIONS

(71) Applicant: Verizon Patent and Licensing Inc., Arlington, VA (US)

(72) Inventor: Stephen Alexander Fitchett, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 559 days.

(21) Appl. No.: 16/201,162

(22) Filed: Nov. 27, 2018

(65) Prior Publication Data

US 2020/0166371 A1     May 28, 2020

(51) Int. Cl.
*G01C 21/00* (2006.01)
*G01C 21/36* (2006.01)
*G01C 21/34* (2006.01)

(52) U.S. Cl.
CPC ..... *G01C 21/3673* (2013.01); *G01C 21/3407* (2013.01)

(58) Field of Classification Search
None
See application file for complete search history.

(56) References Cited

U.S. PATENT DOCUMENTS

| 8,892,356 | B1* | 11/2014 | Weiland | G06F 16/29 701/431 |
| 2012/0278339 | A1* | 11/2012 | Wang | G06F 16/29 707/748 |
| 2017/0091350 | A1* | 3/2017 | Bauer | G06F 30/15 |

* cited by examiner

*Primary Examiner* — Truc M Do

(57) ABSTRACT

A device can parse a query to determine a first road identified by the query and a second road identified by the query. The device can determine a plurality of road segment pairs that include a first road segment of a first plurality of road segments associated with the first road and a second road segment associated with second plurality of road segments associated with the second road. The device can determine a plurality of candidate intersection points based on the plurality of road segment pairs. The device can determine an intersection of the first road and the second road based on the plurality of candidate intersection points and can provide, to a client device, information identifying the intersection of the first road and the second road.

20 Claims, 24 Drawing Sheets

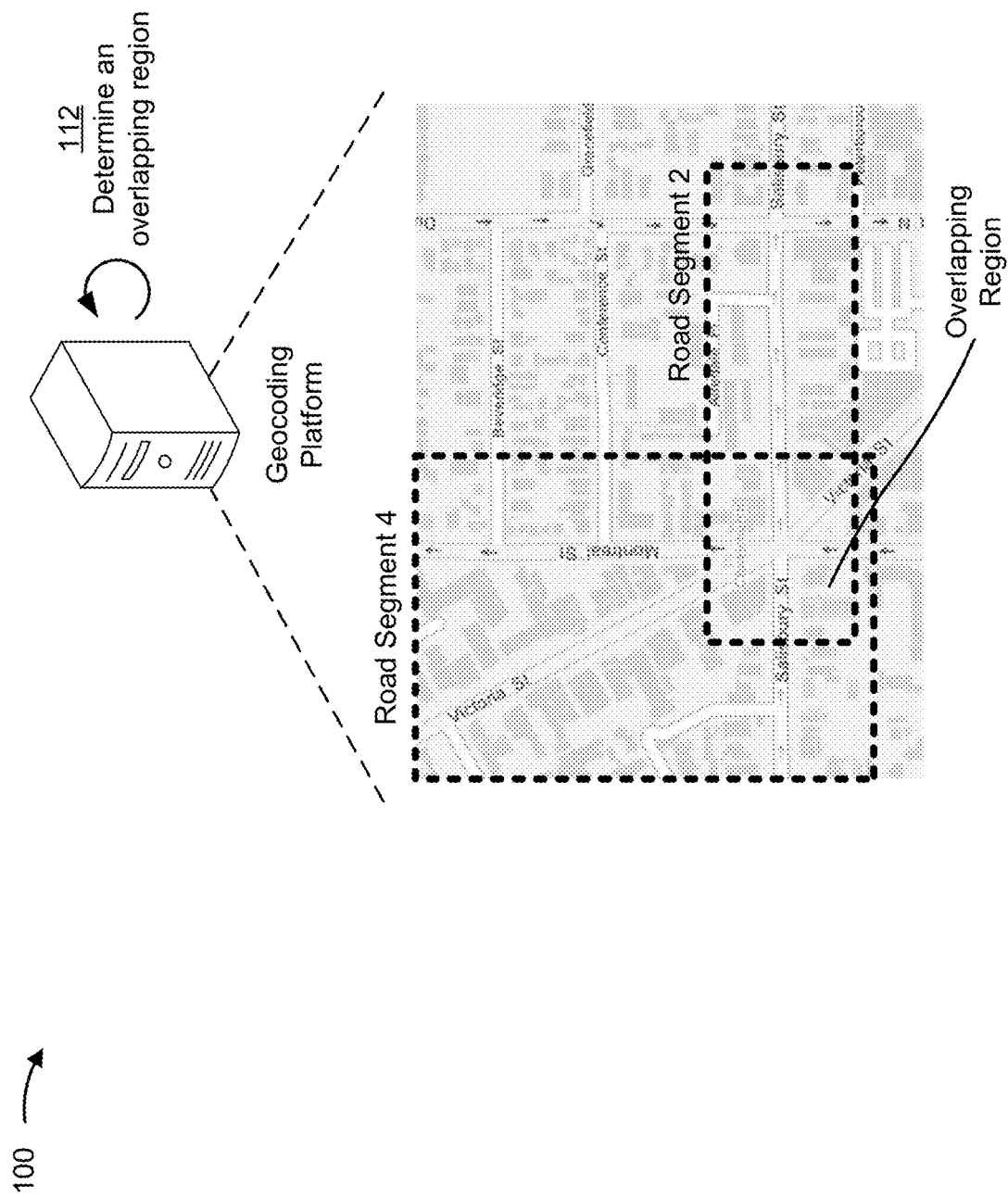

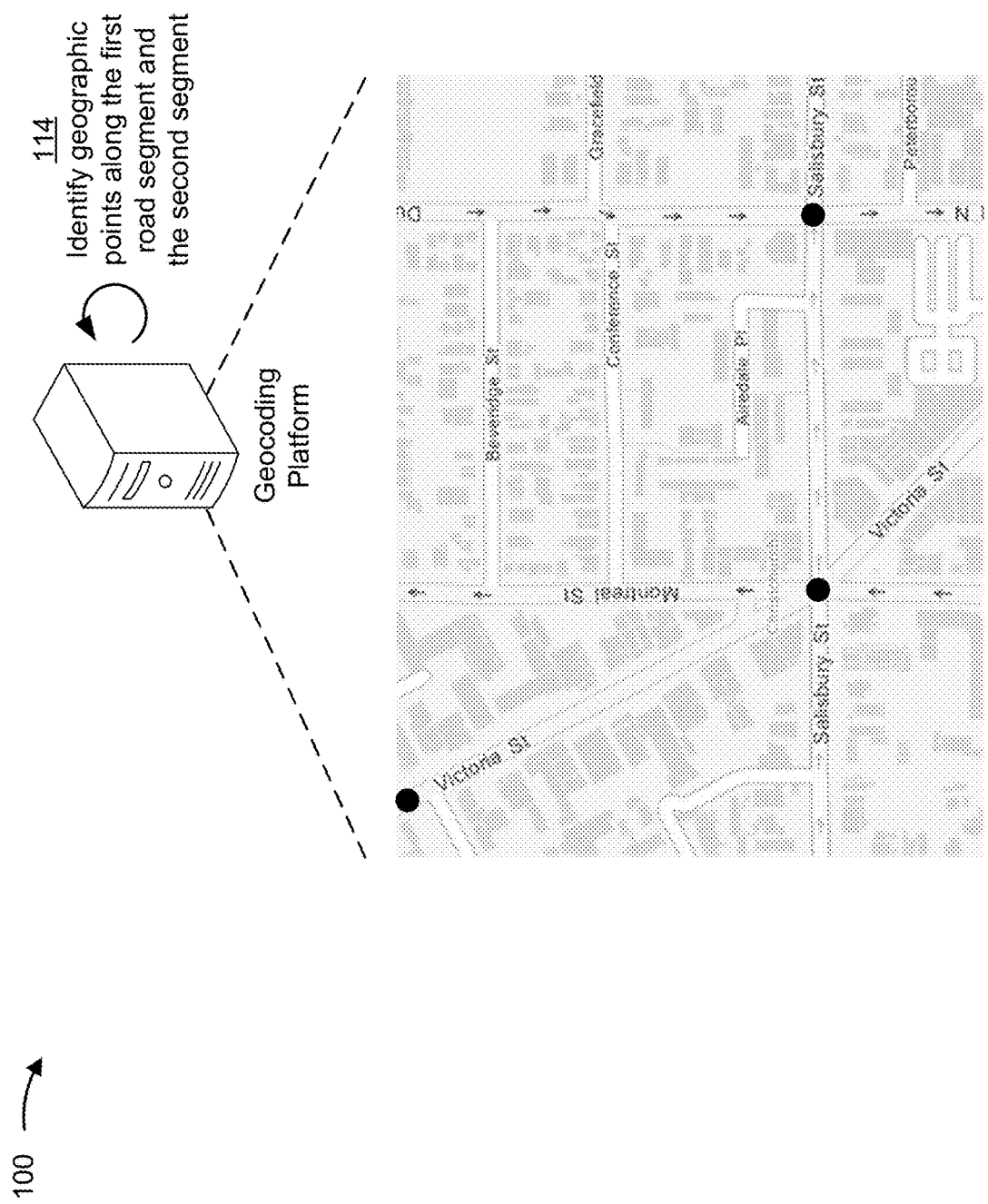

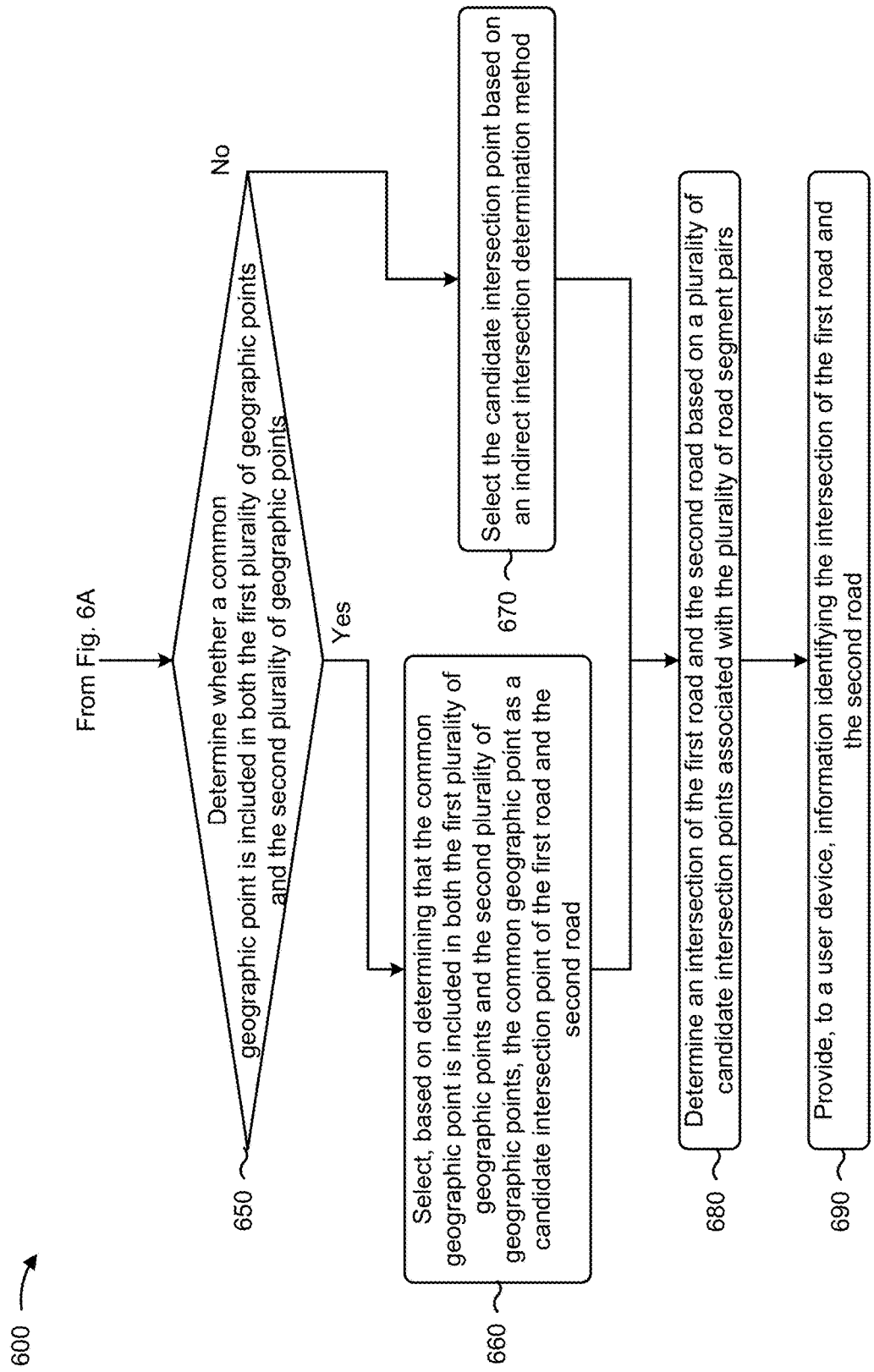

SMART GEOCODING OF ROAD INTERSECTIONS

BACKGROUND

Geocoding can include one or more processes to code a geographic location with information identifying the geographic location, such as positioning coordinates, address information, and/or the like.

BRIEF DESCRIPTION OF THE DRAWINGS

FIGS. 1A-1J are diagrams of an example implementation described herein.

FIGS. 6A and 6B are a flow chart of an example process for smart geocoding of road intersections.

DETAILED DESCRIPTION OF PREFERRED EMBODIMENTS

Figure 1A:
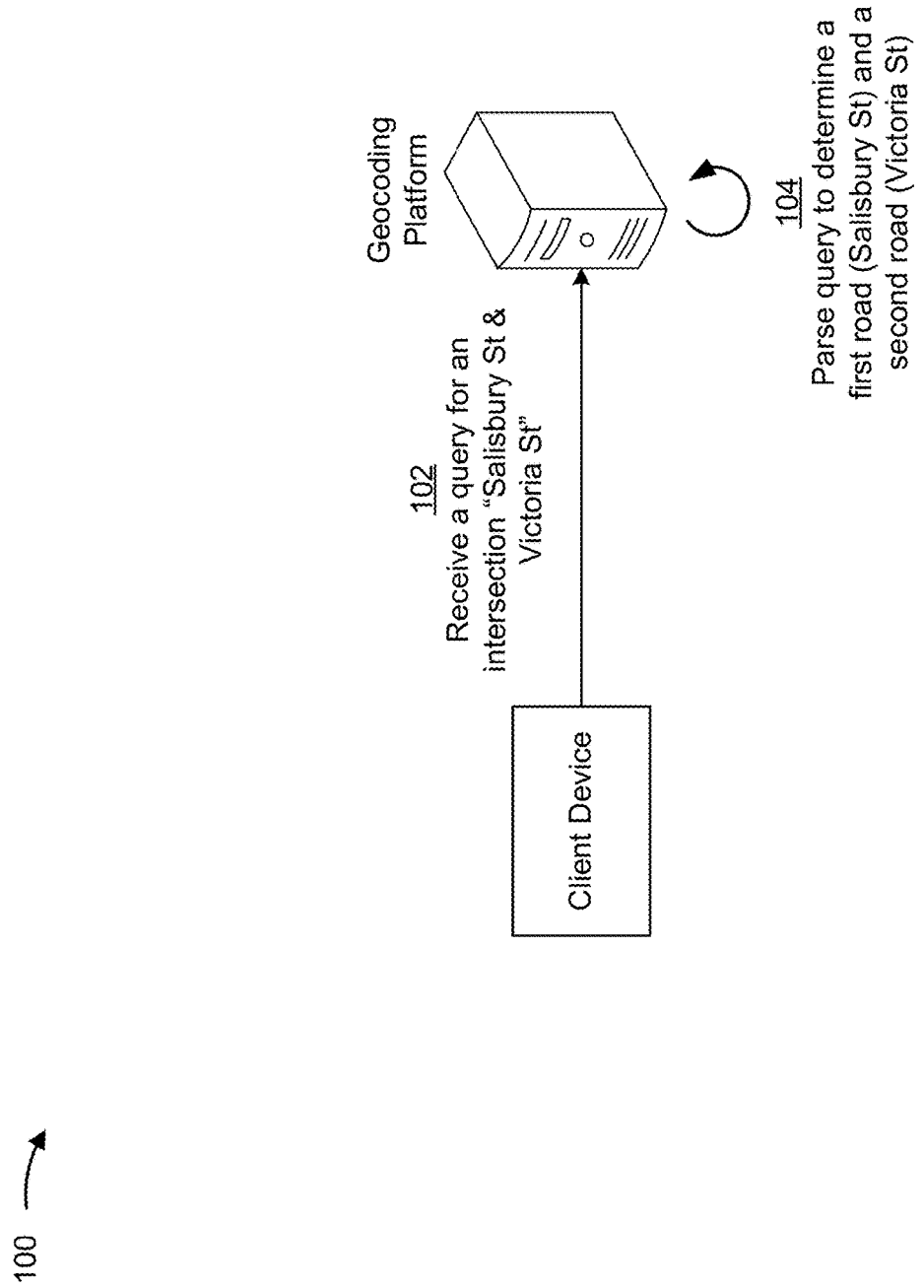

The following detailed description of example implementations refers to the accompanying drawings. The same reference numbers in different drawings can identify the same or similar elements.

Some devices can exist to geocode intersections of two or more roads. A "road", as used herein, can refer to any paved or unpaved medium on which a vehicle, pedestrian, cycle, and/or the like, can travel, such as a street (e.g., a local street, a city street, and/or the like), a highway, an expressway, a turnpike, a cycle path, a walking path, and/or the like. However, the devices can be slow and inefficient when geocoding an intersection, when processing queries to identify an intersection, and/or the like. Moreover, the devices can be unable to geocode complex intersections, such as intersections that include highway entrance and/or exit ramps, roundabouts, split roads (e.g., roads on which different directions of travel are split by a median or divider), and/or the like.

Some implementations described herein provide a geocoding platform that is capable of quickly and efficiently geocoding intersections of roads. Moreover, the disclosed geocoding platform can be capable of geocoding complex intersections, such as the complex intersections described above. In some implementations, the geocoding platform can parse a query to determine a first road identified by the query and a second road identified by the query. The geocoding platform can identify a first plurality of road segments associated with the first road and a second plurality of road segments associated with the second road. The geocoding platform can determine a plurality of road segment pairs, wherein each road segment pair, of the plurality of road segment pairs, includes a first road segment of the first plurality of road segments and a second road segment of the second plurality of road segments. The geocoding platform can, for each road segment pair, of the plurality of road segment pairs, identify a first plurality of geographic points along the first road segment, identify a second plurality of geographic points along the road segment, determine whether a common geographic point is included in both the first plurality of geographic points and the second plurality of geographic points, and select, based on determining that the common geographic point is included in both the first plurality of geographic points and the second plurality of geographic points, the common geographic point as a candidate intersection point of the first road and the second road. The geocoding platform can determine an intersection of the first road and the second road based on a plurality of candidate intersection points associated with the plurality of road segment pairs, and can provide, to a client device, information identifying the intersection of the first road and the second road.

In this way, the geocoding platform can process the query more quickly, while using fewer processing, memory, and/or networking resources to process the query relative to a device that uses inferior techniques to process a query. Moreover, implementations described herein enable the geocoding platform to increase the accuracy of identifying the intersection of the first road and the second road (e.g., by identifying the first plurality of geographic points along the first road segment and the second plurality of geographic points along the second road segment, and by determining whether the common geographic point is included in both the first plurality of geographic points and the second plurality of geographic points). Moreover, in cases where a common geographic point cannot be identified, such as where the first road and the second road can form a complex intersection, the geocoding platform can perform various indirect intersection determination techniques to process the query, such as traversing a route between geographic points included in the first road and the second road, determining an angle between the first road and a connecting link that indirectly connects the first road and the second road, and/or the like.

FIGS. 1A-1J are diagrams of an example implementation 100 described herein. As shown in FIGS. 1A-1J, implementation 100 can include various devices, such as a client device, a geocoding platform, and/or the like.

In some implementations, the client device can be a device capable of communicating with the geocoding platform to receive various types of information, such as location information, mapping information (e.g., information representing a graphical map fragment, a structured file that includes information associated with a map of a particular geographic region, and/or the like), navigation information (e.g., information identifying one or more navigation directions to a particular location, information identifying a route to a particular location, and/or the like), point of interest information (e.g., information identifying one or more points of interest, information identifying one or more attributes of a point of interest, and/or the like), and/or the like. The client device can include a display to display the various types of information, can include a speaker to provide the various types of information via audio, and/or the like.

In some implementations, the client device can transmit various types of information to the geocoding platform. For example, the client device can transmit location information associated with the client device (e.g., world geodetic system (WGS) coordinates associated with the client device's geographical location, coordinates associated with the client device's geographical location expressed in another coordinate system, and/or the like), one or more queries (e.g., a query for navigation directions to a particular location, a query for information identifying an intersection of two or more roads, and/or the like), and/or the like.

In some implementations, the geocoding platform can communicate with the client device to receive the location information, the one or more queries, and/or the like. In some implementations, the geocoding platform can parse a query, of the one or more queries, to determine a first road and a second road identified by the query, can determine an intersection of the first road and the second road, and can provide, to the client device, information identifying the intersection of the first road and the second road. In some implementations, the geocoding platform can determine, based on the intersection of the first road and the second road, a route to a particular location, a route to the intersection, and/or the like. In some implementations, the geocoding can provide, to the client device, navigation information that identifies the route, mapping information that identifies the route, and/or the like. In some implementations, the geocoding platform can provide, to the client device, instructions to automatically navigate a vehicle (e.g., an autonomous driving vehicle, a semi-autonomous driving vehicle, and/or the like) based on the route.

Turning to FIG. 1A, and as shown by reference number 102, the client device can transmit a query to the geocoding platform. For example, as shown in FIG. 1A, the query can be for the geocoding platform to identify an intersection of two or more roads (e.g., Salisbury St and Victoria St). In some implementations, the client device can be instructed to provide the query to the geocoding platform via a mapping application associated with the client device, via a navigation application associated with the client device, via a web browser associated with the client device, and/or the like. In some implementations, the query can be associated with the navigation of a route in which the intersection is included. In some implementations, the client device can automatically provide the query to the geocoding platform based on being instructed to navigate a route to a particular location.

As further shown in FIG. 1A, and as shown by reference number 104, the geocoding platform can receive the query and can parse the query to determine a first road (e.g., Salisbury St) and a second road (e.g., Victoria St) identified in the query. For example, the geocoding platform can parse the query to identify a plurality of road name identifiers (e.g., "St", "Street", "Cr", "Circle", "Ln", "Road", and/or the like), and can determine the first road and the second road based on the plurality of road name identifiers.

In some implementations, when parsing the query, the geocoding platform can identify an operator, a keyword, and/or the like, that is associated with a query for an intersection. For example, the geocoding platform can identify an ampersand operator in the query "Salisbury St & Victoria St", and can determine whether the query is for the identification of an intersection between "Salisbury St" and "Victoria St" or for the identification of a street named "Salisbury St & Victoria St". In another example, the geocoding platform can determine that the query is for the identification of an intersection based on identifying a keyword "intersection", "corner", "cnr", "and", and/or another operator. In some implementations, the geocoding platform can perform additional processing on the query to determine whether a query includes a request for the identification of an intersection or the identification of a road. For example, the query can include "A & B St", and the geocoding platform can match the roads against actual geographic data and/or the like to determine whether the query includes a request for the identification of an intersection of an "A St" and a "B St" or the identification of a road "A & B St".

Figure 1B:
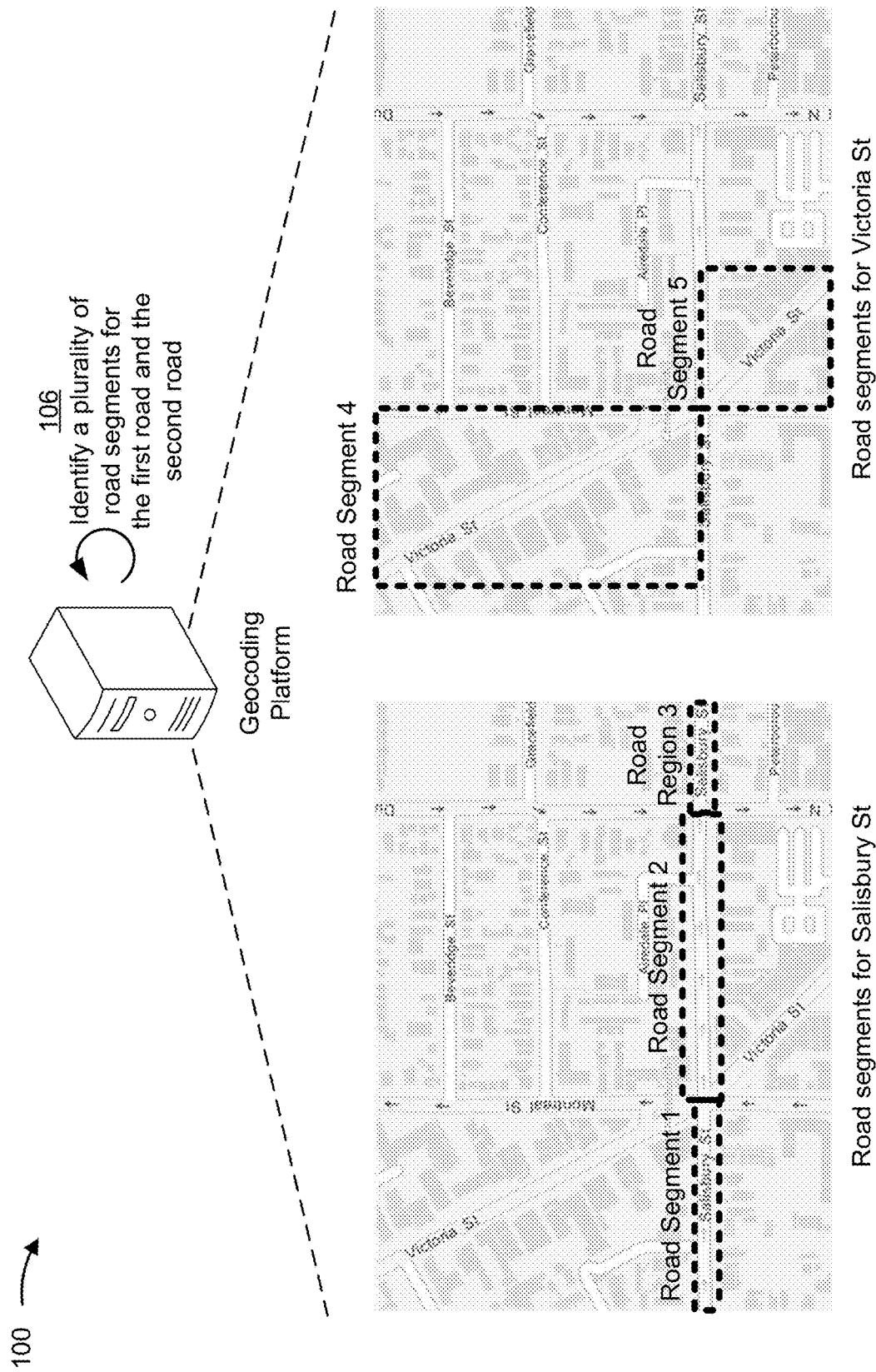

Turning to FIG. 1B, and as shown by reference number 106, the geocoding platform can identify one or more road segments for the first road identified in the query (e.g., road segment 1, road segment 2, and road segment 3), and one or more second road segment for the second road identified in the query (e.g., road segment 4 and road segment 5). A road segment can include a geographic portion of a road. The geographic portion of the road can be a geographic portion, of the road, between one or more other roads (e.g., that is bound on each end of the road segment by another road), can be a portion, of the road, that does not terminate at one or more ends at another road, and/or the like. For example, road segment 1 can include a geographic portion, of Salisbury St, between Montreal St and Park Terrace; road segment 2 can include a geographic portion, of Salisbury St, between Montreal St and Durham St N; road segment 3 can include a geographic portion, of Salisbury St, between Durham St N and Colombo St, and so on.

In some implementations, a road segment can include various shapes and/or sizes, such as a rectangular shape, a square shape, a circle shape, an irregular or non-standard shape, a random shape, and/or the like. In some implementations, the geocoding platform can select the type of shape to use for the one or more first road segment and/or the one or more second road segment based on various factors, such as input received from a user, based on the geometry of the first road, the second road, and/or other roads near the first road and/or the second road, and/or the like.

In some implementations, the geocoding platform can identify the one or more first road segment and/or the one or more second road segment in a particular geographic area, such as a town, a county, a state, a country, a geographic area of a particular size (e.g., a particular radius, a particular width and length, and/or the like), and/or the like. For example, the geocoding platform can perform a geographic search to locate the first road, can identify one or more candidate geographic areas in which the first road is located, can perform a geographic search to determine whether the second road is located in each candidate geographic area, of the plurality of candidate geographic areas, and can identify the one or more first road segment and the one or more second road segment in the candidate geographic area in which both the first road and the second road are located. As another example, the geocoding platform can perform a geographic search to locate the second road, can identify one or more candidate geographic areas in which the second road is located, can perform a geographic search to determine whether the first road is located in each candidate geographic area, of the plurality of candidate geographic areas, and can identify the one or more first road segment and the one or more second road segment in the candidate geographic area in which both the first road and the second road are located. As another example, the geocoding platform can search for the first road and the second road simultaneously, such that the geocoding platform can identify a first search result for the second road, and can identify a first result for the first road while simultaneously identifying a second result for the second road.

In some implementations, the geocoding platform can determine the quantity of the one or more first road segments to identify and/or can determine the quantity of the one or more second road segments to identify based on the size of the geographic area, based on the shape of the geographic area, based on being programmed to identify a particular quantity of first road segments and/or a particular quantity of second road segments, and/or the like. In some implementations, the quantity of the one or more first road segments and the quantity of the one or more second road segments to identify based on the size of the geographic area can be different quantities or can be the same quantity. In some implementations, the geocoding platform can determine to prioritize some road segments over other road segments based on the location of the client device relative to the road segments, based on a geographic hint (e.g., provided as input to the client device), and/or the like.

Figure 1C:
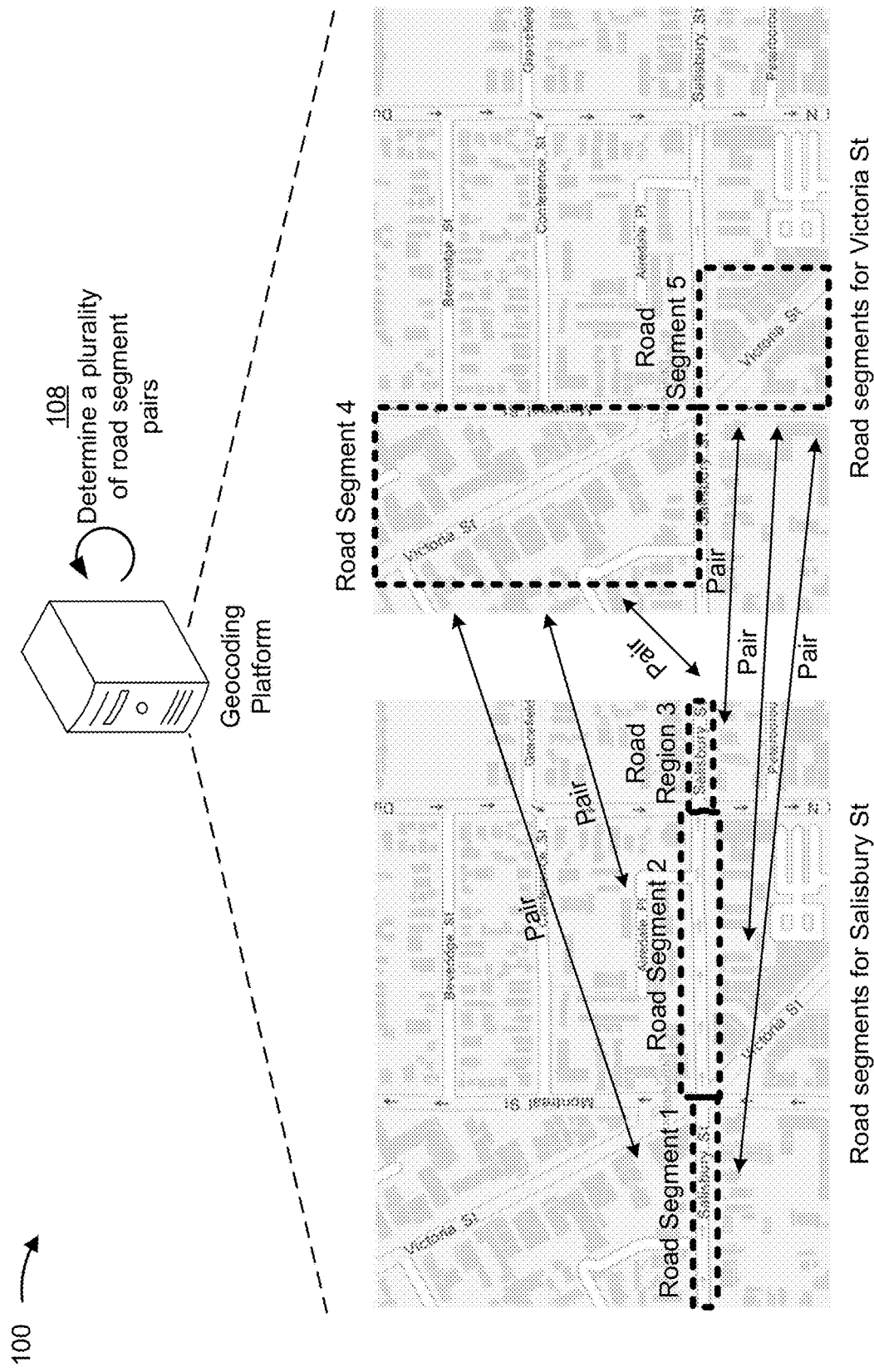

Turning to FIG. 1C, and as shown by reference number 108, the geocoding platform can determine a plurality of road segment pairs, wherein each road segment pair, of the plurality of road segment pairs, includes a first road segment of the first plurality of road segments, and a second road segment of the second plurality of road segments. For example, the geocoding platform can determine a first road segment pair that includes road segment 1 and road segment 4, can determine a second road segment pair that includes road segment 2 and road segment 4, can determine a third road segment pair that includes road segment 1 and road segment 5, and so on. In some implementations, the geocoding platform can determine the road segments to include in a road segment pair based on the road segments being geographically contiguous, based on the road segments geographically overlapping, based on the road segments sharing a border, and/or the like. In some implementations, the geocoding platform can determine that two road segments are to be included in a road segment pair even if the road segments do not overlap and/or are not contiguous.

Figure 1D:
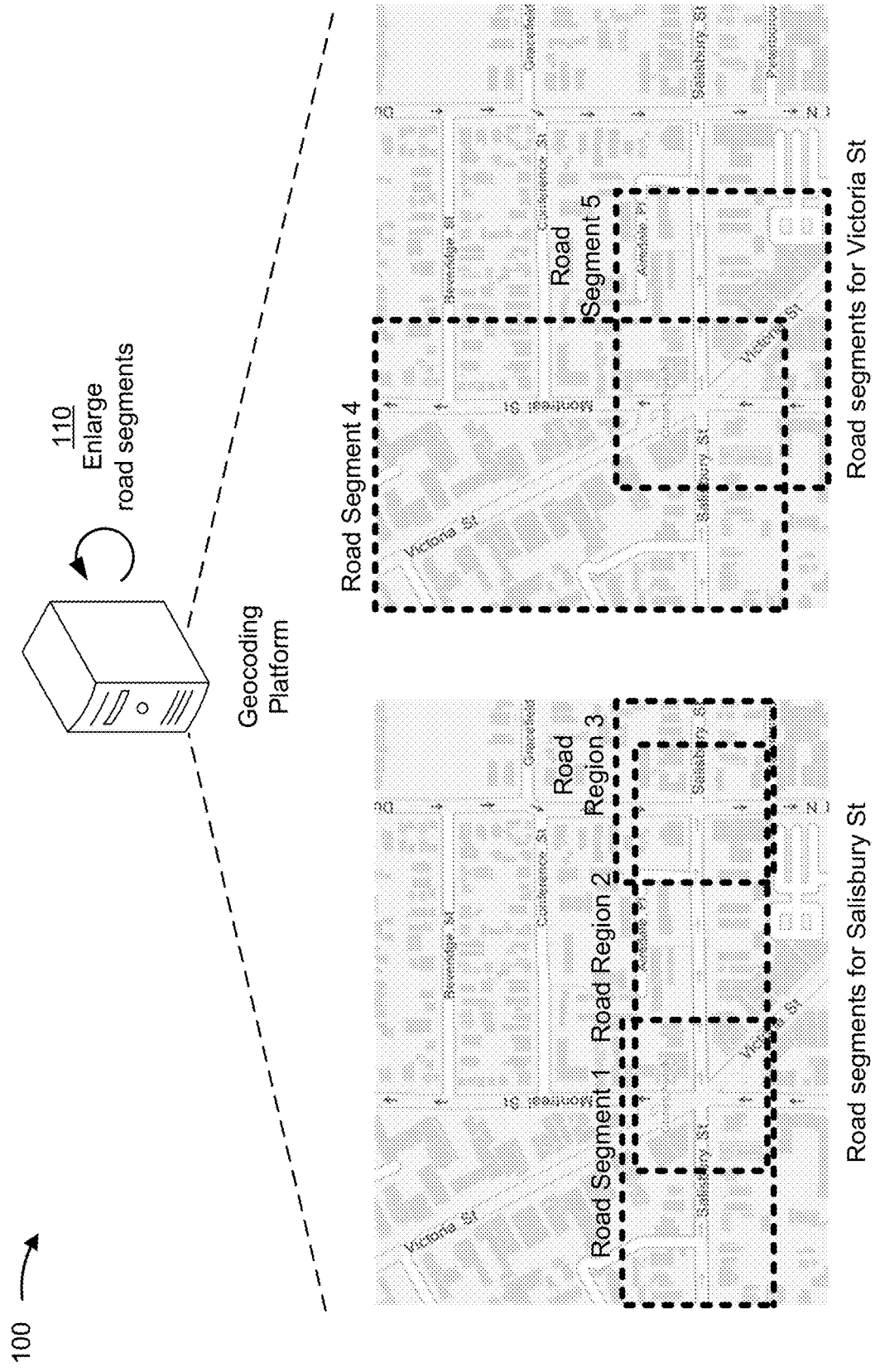

Turning to FIG. 1D, and as shown by reference number 110, to determine whether road segments, that do not overlap and/or are not contiguous, are to be included in a road segment pair, the geocoding platform can enlarge the size of the one or more first road segments and/or can enlarge the size of the one or more second road segments. For example, the geocoding platform can increase the radius of a road segment, can increase the length and/or width of a road segment, and/or the like. As explained above, a road segment for the first road or the second road can be bound by one or more other roads. In this way, the geocoding platform can enlarge the road segment such that the road segment can encompass geographic areas that can potentially include an intersection of the first road and the second road.

In some implementations, the geocoding platform can enlarge the size of the one or more first road segments and/or can enlarge the size of the one or more second road segments by different amounts, by the same amount, and/or the like. In some implementations, the amount at which a particular road segment is enlarged can be specified by a user, can be automatically determined by the geocoding platform based on a size of the geographic area, based on a size of the particular road segment, based on the quantity of the one or more first road segments and/or the quantity of the one or more second road segments, and/or the like. In some implementations, a particular road segment can be symmetrically enlarged (e.g., a rectangular road segment can be enlarged relative to one or more axes, a circular road segment can be enlarged equally along the circumference of the circular road segment, and/or the like), can be asymmetrically enlarged (e.g., a rectangular road segment can be enlarged different amounts on each side of a particular axis), and/or the like.

Turning to FIG. 1E, and as shown by reference number 110, to determine whether road segments, that do not overlap and/or are not contiguous, are to be included in a road segment pair, the geocoding platform can determine an overlapping region between a road segment of the one or more first road segments (e.g., road segment 2 for Salisbury St) and a road segment of the one or more second road segments (e.g., road segment 4 for Victoria St). The overlapping region can include a region in which at least a portion of road segment 2 and at least a portion of road segment 4 overlap. As explained above, the geocoding platform can enlarge the one or more first road segments and/or the one or more second road segments. Accordingly, the overlapping region in which the portion of road segment 2 and the portion of road segment 4 overlap can potentially include an intersection of the first road and the second road. In some implementations, the geocoding platform can identify the overlapping region using various techniques for indexing spatial and/or geographical coordinates, such as an R-tree data structure and/or similar data structure.

Turning to FIG. 1F, and as shown by reference number 114, the geocoding platform can, for a particular road segment pair, identify a first plurality of geographic points along the first road segment (e.g., road segment 4) included in the road segment pair, and can identify a second plurality of geographic points along the second road (e.g., road segment 2) included in the road segment pair. In some implementations, the geocoding platform can identify geographic points along a particular road segment at each end of the road segment, at bends and/or curves in the road segment, and/or the like. In some implementations, the geocoding platform can determine a spacing (and thus the quantity) of the first plurality of geographic points and/or a spacing of the second plurality of geographic points based on various factors, such as based on the size of the road segment (e.g., the greater the size of the road segment, the greater the spacing of geographic points can be), based on a specified accuracy for identifying the geographic location of the intersection of the first road and the second road (e.g., the accuracy of identifying the geographic location of the intersection of the first road and the second road can be increased as the spacing between the geographic points is decreased), based on processing, memory, and/or networking resource availability for identifying the geographic location of the intersection of the first road and the second road (e.g., the processing, memory, and/or network resource usage by the geocoding platform can increase as the spacing between geographic points decreases since the geocoding platform is to process a greater quantity of geographic points), and/or the like.

Figure 1G:
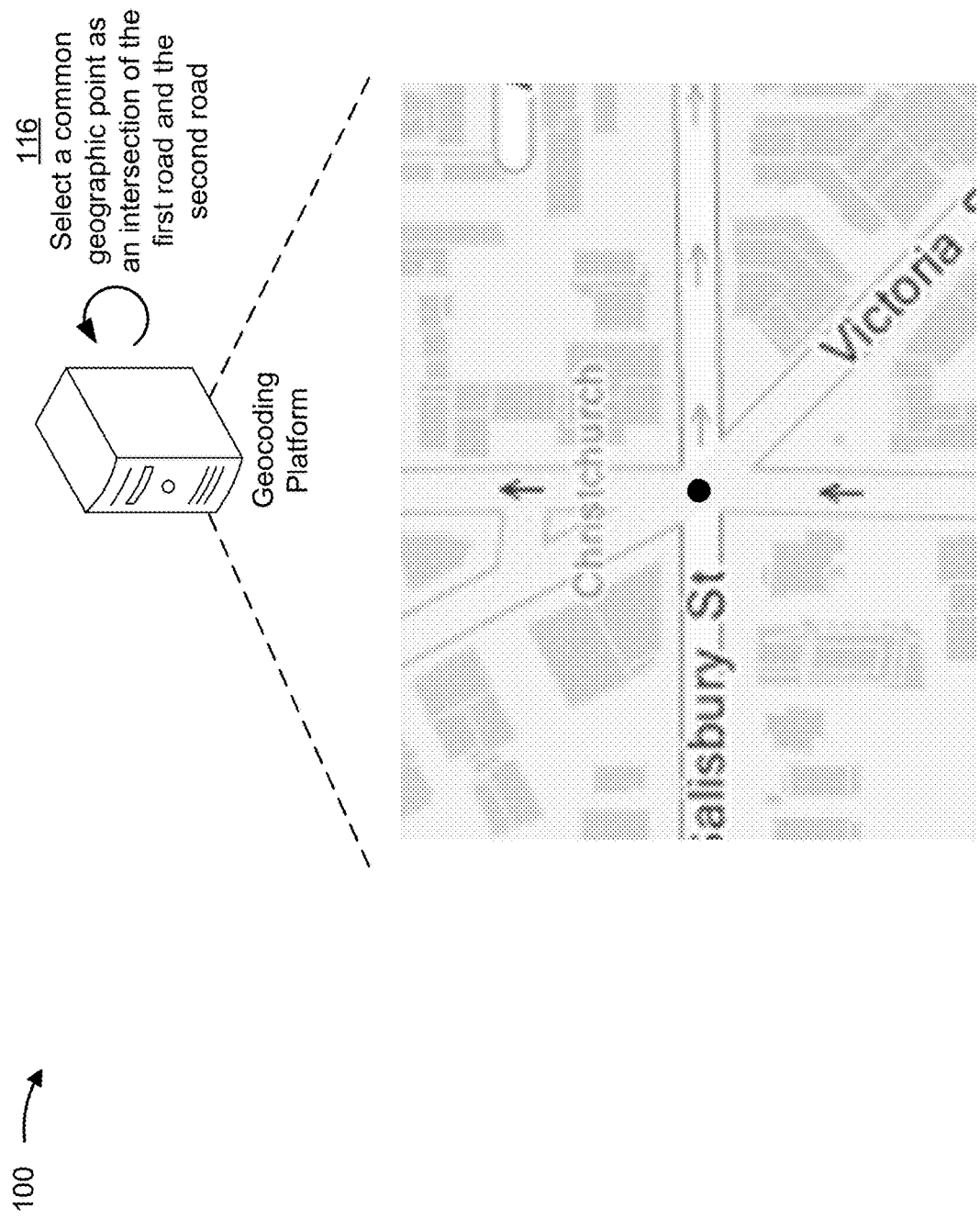

Turning to FIG. 1G, and as shown by reference number 116, the geocoding platform can determine whether a common geographic point is included in both the first plurality of geographic points and the second plurality of geographic points, and can select the common geographic point as a candidate intersection point of the first road (e.g., Salisbury St) and the second road (e.g., Victoria St) based on determining that the common geographic point is included in both the first plurality of geographic points and the second plurality of geographic points. In some implementations, a common geographic point can be defined as a complete and/or exact overlap of a first geographic point included in the first plurality of geographic points and a second geographic point included in the second plurality of geographic points. In some implementations, a threshold can be used to determine the common geographic point such that the common geographic point can be defined as a partial overlap of a first geographic point included in the first plurality of geographic points and a second geographic point included in the second plurality of geographic points, can be defined as a substantial overlap of a first geographic point included in the first plurality of geographic points and a second geographic point included in the second plurality of geographic points (e.g., the overlap of the first geographic point and the second geographic point satisfies a threshold percentage of overlap), can be defined as a first geographic point included in the first plurality of geographic points being a distance from a second geographic point included in the second plurality of geographic points that satisfies a threshold distance, and/or the like.

In some implementations, the geocoding platform can verify that the identified intersection of the first road and the second road matches the query received from the client device. For example, if the query included information identifying a particular city, state, and/or the like, in which the intersection can be located, the geocoding platform can verify that the identified intersection is located in the city, state, and/or the like, identified in the query. In some implementations, the geocoding platform can limit and/or exclude road segments that are identified based on a region, location, postal code, and/or the like, identified in the query. In some implementations, the first road and the second road can intersect at a plurality of locations, and a first location, of the plurality of locations, can be located in a city, state, and/or the like, that is different from a second location of the plurality of locations. In some implementations, if the geocoding platform identifies an intersection, of the first road and the second road, at a location that is included in a city, state, and/or the like, that is different from the city, state, and/or the like, that is specified in the query, the geocoding platform can discard the identified intersection and can continue to search for an intersection that is at a location that is included in the city, state, and/or the like, that is specified in the query. In some implementations, an intersection can be located in a plurality of regions, such as if the intersection is located in a city, state, postcode boundary, and/or the like, and the geocoding platform can match against one or more of the plurality of regions, in which case the geocoding platform may perform some additional validation to identify the intersection.

In some implementations, when the geocoding platform determines that no common geographic point is included in the first plurality of geographic points and the second plurality of geographic points, the geocoding platform may perform one or more actions, methods, techniques, and/or processes to determine an indirect candidate intersection point for the first road segment and the second road segment. For example, the geocoding platform may perform one or more actions described below in connection with FIGS. 2A-2F, which enables the geocoding platform to determine candidate intersection points for indirect intersections, such as roundabouts, split roads, and/or the like.

Figure 1H:
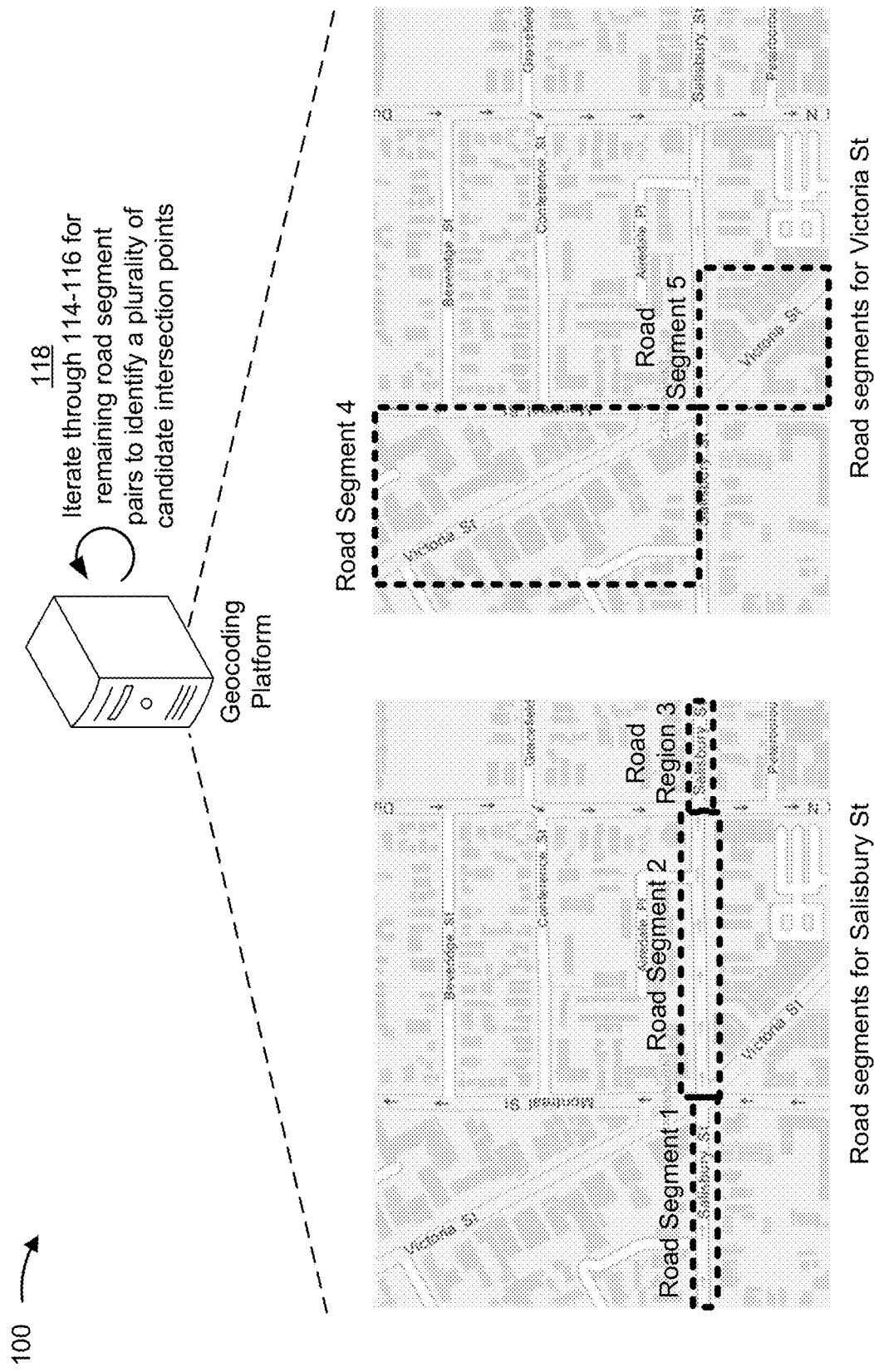

Turning to FIG. 1H, and as shown by reference number 118, the geocoding platform can iterate through the actions performed at 114-116 for the remaining road segment pairs. In this way, the geocoding platform determines a plurality of candidate intersection points for the intersection of the first road and the second road.

Figure 1I:
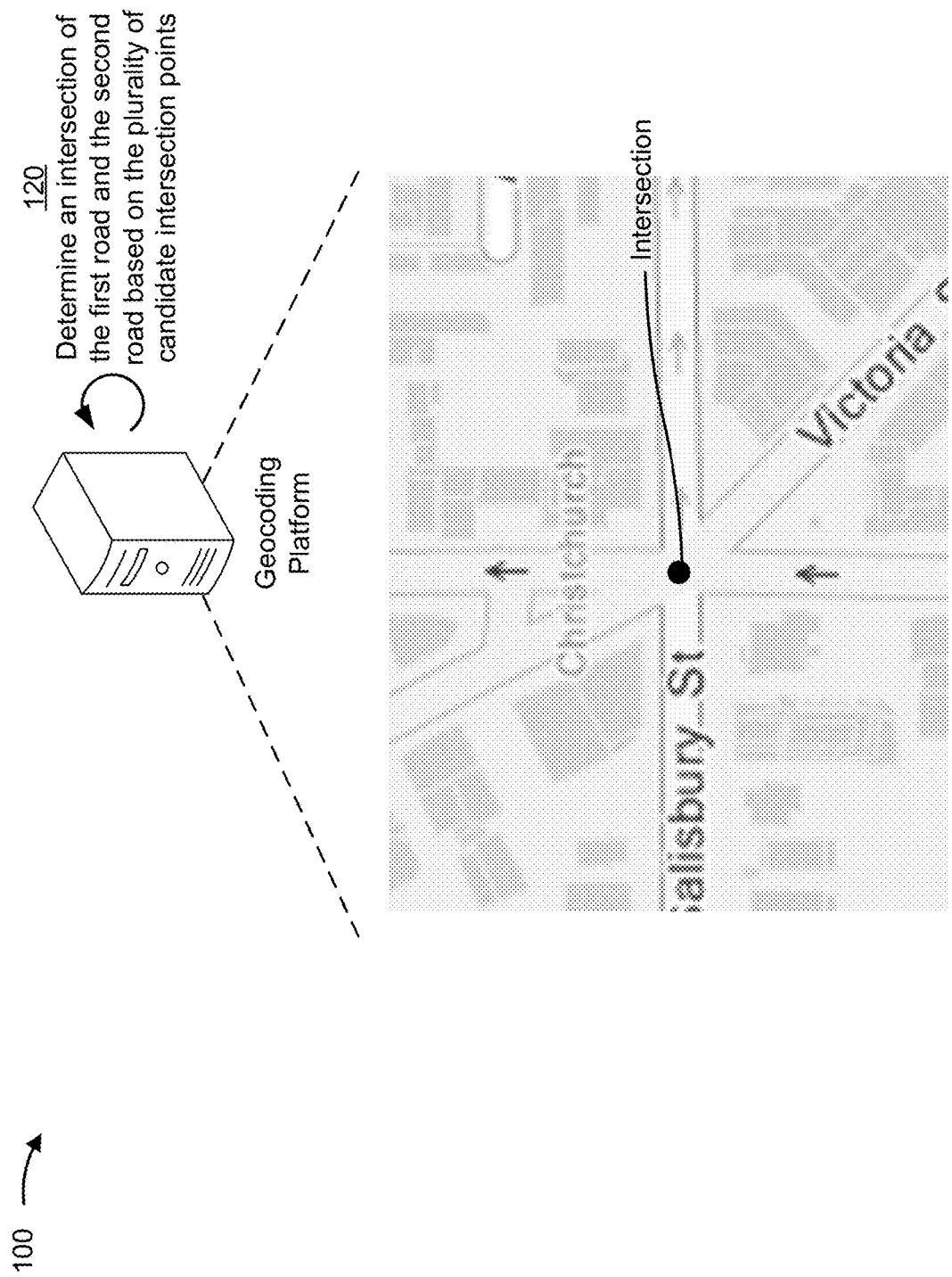

Turning to FIG. 1I, and as shown by reference number 120, the geocoding platform can determine the intersection of the first road and the second road based on the plurality of candidate intersection points. In some implementations, the geocoding platform can determine that the plurality of candidate intersection points are the same geographic location, and therefore can determine the intersection of the first road and the second road to be located at the plurality of candidate intersection points.

In some implementations, when one or more of the plurality of candidate intersection points are not located at the same geographic location (e.g., such as when the intersection is a complex intersection, such as when a road can include a highway with entrance ramps and exit ramps that intersect with another road, and/or the like), the geocoding platform can perform one or more methods, techniques, and/or processes to determine the intersection between the first road and the second road. For example, the geocoding platform may perform one or more actions described below in connection with FIGS. 3A-3D.

Figure 1J:
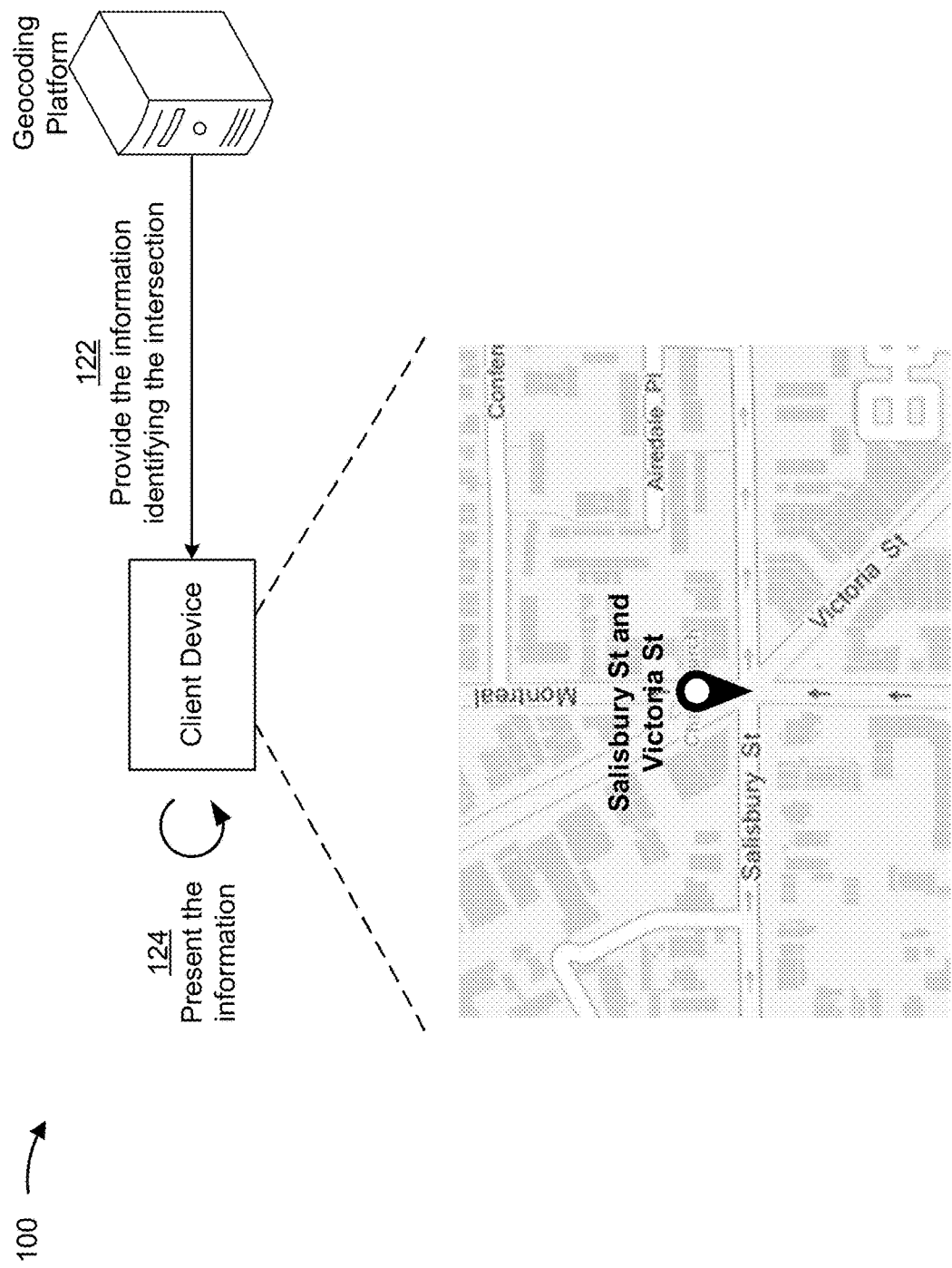

Turning to FIG. 1J, and as shown by reference number 122, the geocoding platform can provide information, identifying the intersection of the first road and the second road, to the client device. In some implementations, the geocoding platform can automatically provide the information to satisfy the query received from the client device. In some implementations, the geocoding platform can identify the intersection of the first road and the second road prior to receiving a query from the client device (e.g., the geocoding platform can pre-code or preprocess intersections of roads), and can provide the information after receiving the query, which decreases the amount of time it takes the geocoding platform to process the query. In some implementations, the geocoding platform can store the information in a data structure so that the information can be provided based on receiving additional queries (e.g., from the client device, from another device, and/or the like).

As further shown in FIG. 1J, and as shown by reference number 124, the client device can present the information identifying the intersection of the first road and the second road. In some implementations, the information identifying the intersection can include positioning coordinates that correspond to the geographic location of the intersection, can include the names of the first road and the second road, can include navigation directions that include the intersection, and/or the like. In some implementations, if the client device includes a display device, the client device can display, via the display device, a visual indicator of the intersection on a map, can display navigation directions to navigate to and/or through the intersection, and/or the like. In some implementations, if the client device includes a speaker device, the client device can play a voice command that describes the location of the intersection, that describes one or more directions to navigate to the intersection, that describes one or more directions to navigate relative to the intersection, and/or the like. In some implementations, the client device can use the information to automatically navigate a vehicle (e.g., an autonomous driving vehicle, a semi-autonomous driving vehicle, and/or the like) to the intersection, through the intersection, and/or the like, based on the information. In some implementations, the information identifying the intersection can include navigation instructions, and the client device can navigate the vehicle based on receiving the instructions.

In some implementations, two or more roads identified in a query may intersect at a plurality of intersections, and the geocoding platform can provide information identifying the plurality of intersections. For example, two roads identified in a query may be self-intersecting roads (e.g., roads that merge into a single road that is named a combination of a first road and a second road, such as Ring Rd/Blake St), which may lead to the geocoding platform determining a plurality of intersections for Ring Rd and Blake St. In this case, the geocoding platform can provide the client device with a ranked or ordered listed of possible intersections for the two roads. The possible intersections can be ranked based on intersection type. For example, a cross-road intersection (e.g., an intersection where two roads intersect) can be assigned a greatest confidence score, a merge of two roads can be assigned a second greatest confidence score, an intersection where one of the two merged roads continues (e.g., an intersection where Ring Rd ends but Blake St continues) can be assigned a third greatest confidence score, an internal intersection associated with the two merged roads (e.g., an intersection where the two merged roads intersect with another road) may be assigned a fourth greatest confidence score, and/or the like. The geocoding platform can rank the possible intersections based on confidence scores, can filter out possible intersections based on intersection type, can filter out intersections when better quality intersection types are found nearby, and/or the like.

In this way, the geocoding platform can process the query more quickly, while using fewer processing, memory, and/or networking resources to process the query. Moreover, implementations described herein enable the geocoding platform to increase the accuracy of identifying the intersection of the first road and the second road (e.g., by identifying the first plurality of geographic points along the first road segment and the second plurality of geographic points along the second road segment, and by determining whether the common geographic point(s) are included in both the first plurality of geographic points and the second plurality of geographic points).

As indicated above, FIGS. 1A-1J are provided merely as an example. Other examples are possible and can differ from what was described with regard to FIGS. 1A-1J.

FIGS. 2A-2F are diagrams of an example implementation 200 described herein. As shown in FIGS. 2A-2F, implementation 200 can include various devices, such as a client device, a geocoding platform, and/or the like. In some implementations, the geocoding platform can be similar to, the same as, and/or implemented by, the geocoding platform described above in FIGS. 1A-1J. In some implementations, FIGS. 2A-2F can further include a client device in communication with the geocoding platform.

In some implementations, implementation 200 can illustrate an implementation where the geocoding platform is to determine a geographic location of an indirect candidate intersection point of a first road and a second road (e.g., a point where the first road and the second road do not directly intersect). In some implementations, the geocoding platform can receive a query for the intersection of the first road and the second road (e.g., Epsom Rd and Alloy St), can parse the query to determine a first road (e.g., Epsom Rd) and a second road (e.g., Alloy St), can generate one or more road segments for the first road and one or more road segments for the second road, and can identify a first plurality of geographic points along the first road segment and a second plurality of geographic points along the second road segment, as described above in reference to reference numbers 104-114.

Figure 2A:
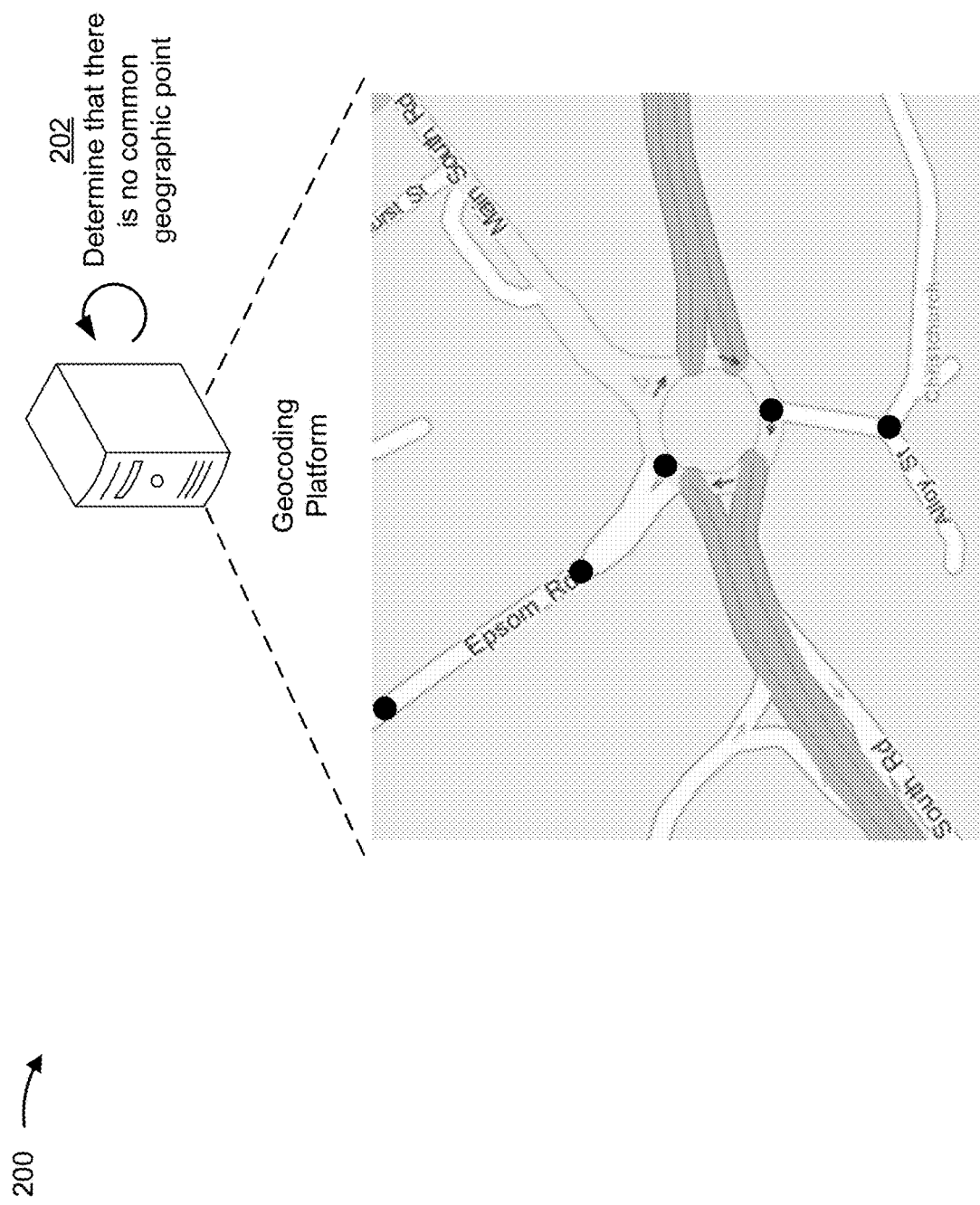
FIGS. 2A-2F are diagrams of an example implementation described herein.

Turning to FIG. 2A, and as shown by reference number 202, the geocoding platform can determine that there is no common geographic point included in both the first plurality of geographic points and the second plurality of geographic points. For example, and as illustrated in FIG. 2A, the first plurality of geographic points can include three geographic points along Epsom Rd, the second plurality of geographic points can include two geographic points along Alloy St, and the geocoding platform can determine that there is no geographic point that is included in both the three geographic points along Epsom Rd and the two geographic points along Alloy St.

Figure 2B:
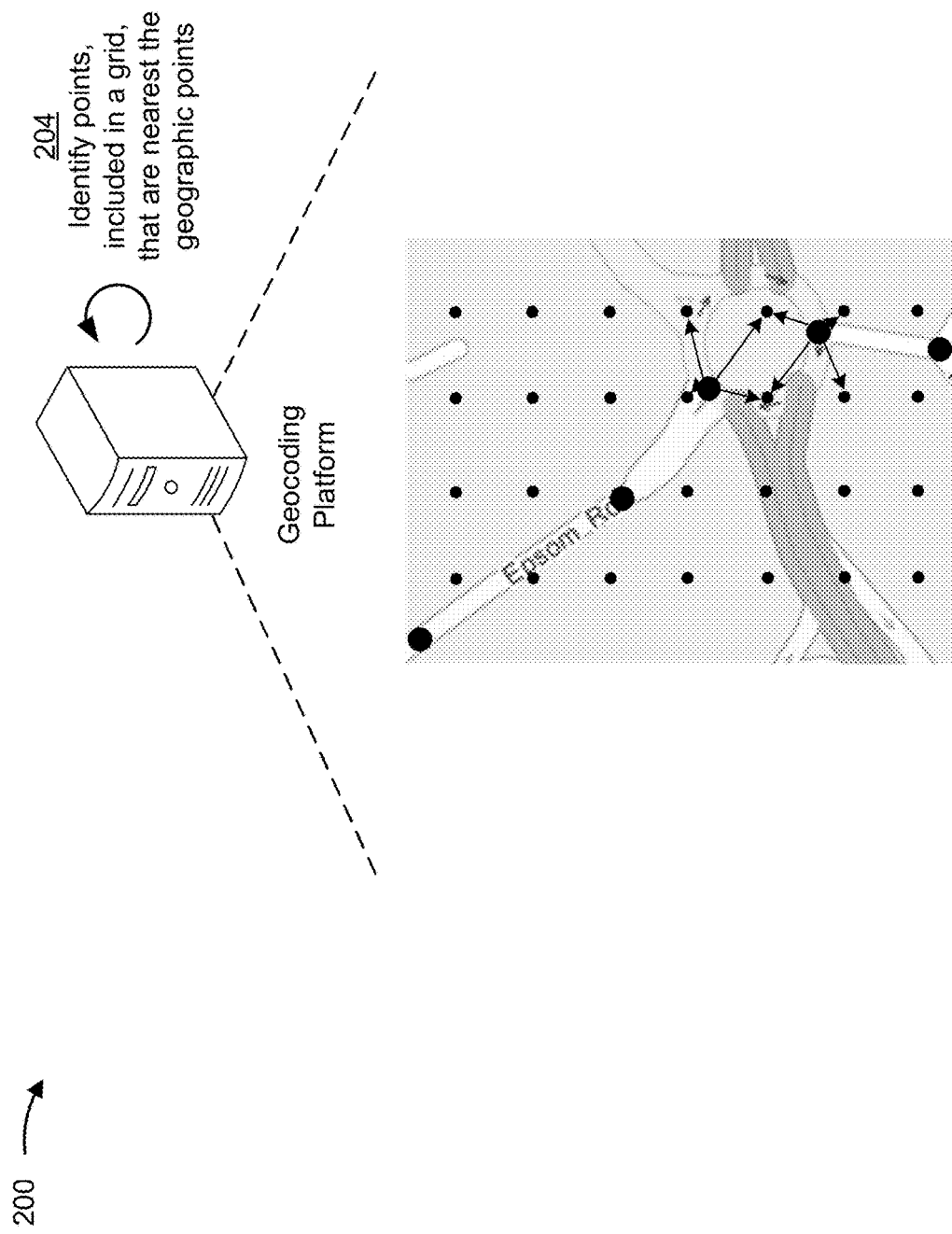

Turning to FIG. 2B, and as shown by reference number 204, the geocoding platform can identify, based on determining that there is no common geographic point included in both the first plurality of geographic points and the second plurality of geographic points, one or more first points, of a plurality of points included in a grid, that are nearest a first geographic point among the first plurality of geographic points, and can identify one or more second points, of the plurality of points included in the grid, that are nearest a second geographic point among the second plurality of geographic points.

In some implementations, the grid can be represented by an algorithm, algebraic formula, and/or the like, and the geocoding platform can identify the one or more first points and/or the one or more second points. In this way, the geocoding platform can use the algorithm, algebraic formula, and/or the like, to locate one or more points, included in the grid, that are nearest the geographic points along the first and second road segments (e.g., by plugging the coordinates of a point in an algebraic formula to determine whether the coordinates of the point produces a result that is closest to the result that is produced by the coordinates of the first geographic point or the second geographic point when plugged into the algebraic formula). In some implementations, the geocoding platform can determine the quantity and/or layout of points that are to be included in the grid of the plurality of points based on various factors, such as the size of the overlapping region, the shape of the overlapping region, the quantity of geographic points included in the first plurality of geographic points, the quantity of geographic points included in the second plurality of geographic points, the density of geographic points included in the first plurality of geographic points, the density of geographic points included in the second plurality of geographic points, user input, and/or the like. In some implementations, the quantity and/or layout of points can be random, arbitrary, and/or the like.

In some implementations, the geocoding platform can identify a plurality of points that form a square around the first geographic point, of the first plurality of geographic points, as the one or more first points that is nearest the first geographic point, and can identify a plurality of points that form a square around the second geographic point, of the second plurality of geographic points, as the one or more second points that is nearest the second geographic point, as shown in FIG. 2B. The geocoding platform can similarly identify one or more points, of the plurality of points, for the remaining geographic points included in the first plurality of geographic points and the second plurality of geographic points. In this way, the geocoding platform can identify pairs of geographic points to analyze further, and can eliminate geographic points from consideration, which reduces and/or eliminates processing and memory resource consumption that would have otherwise been spent on analyzing the eliminated geographic points.

Figure 2C:
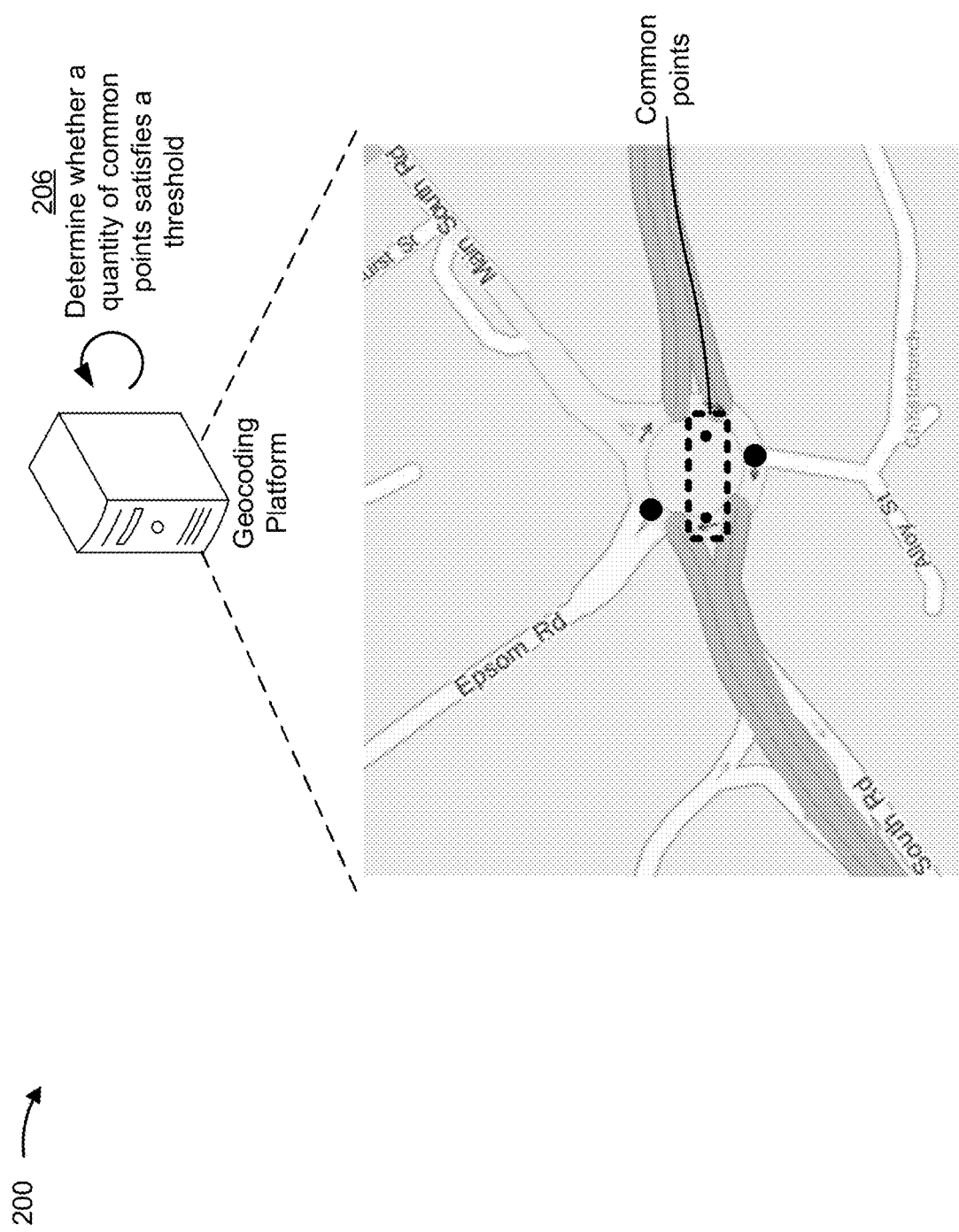

Turning to FIG. 2C, and as shown by reference number 206, the geocoding platform can determine a quantity of common points included in both the one or more first points and the one or more second points, and can determine whether the quantity of common points satisfies a threshold quantity of common points. If the geocoding platform determines that the quantity of common points satisfies the threshold quantity of common points, the geocoding platform can further analyze the first geographic point and the second geographic point to determine whether the first geographic point and the second geographic point can be used to determine the intersection of the first road and the second road. In some implementations, instead of using the threshold quantity of common points, the geocoding platform can determine whether the first geographic point and the second geographic point can be used to determine the intersection of the first road and the second road based on the quantity of common points shared by the first road and the second road being the greatest quantity of common points shared by any of the first plurality of geographic points and the second plurality of geographic points.

In some implementations, the threshold quantity of common points can be selected based on the size of the grid of the plurality of points, based on the quantity of geographic points included in the first plurality of geographic points, based on the quantity of geographic points included in the second plurality of geographic points, based on the density of geographic points included in the first plurality of geographic points, based on the density of geographic points included in the second plurality of geographic points, user input, and/or the like.

Figure 2D:
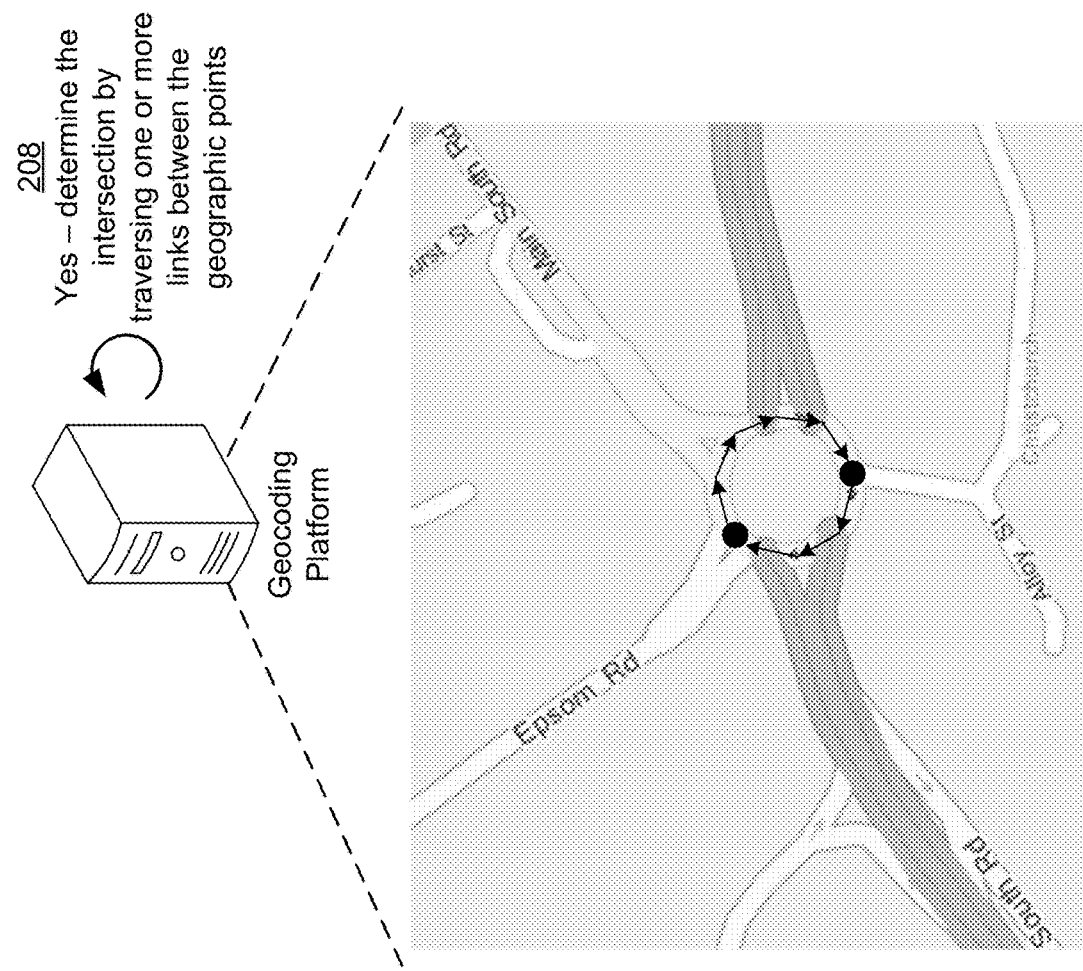

Turning to FIG. 2D, and as shown by reference number 208, the geocoding platform can determine the geographic location of the intersection of the first road and the second road based on the first geographic point and the second geographic point. The geocoding platform can provide information, identifying the intersection of the first road and the second road, to the client device, as described above in connection with FIGS. 1A-1J.

In some implementations, the geocoding platform can determine the geographic location of the intersection of the first road and the second road by traversing one or more connecting links between the first geographic point and the second geographic point (e.g., links that connect the first geographic point to the second geographic point. In some implementations, the geocoding platform can traverse the one or more connecting links based on link types associated with the one or more connecting links. For example, the geocoding platform can determine whether the one or more connecting links are the same type of link type, and accordingly may use the one or more connecting links to determine the geographic location of the intersection. In some implementations, if the geocoding platform determines that, when traversing the one or more links between the first geographic point and the second geographic point, that one of the connecting links is a different link type than the other connecting links, the geocoding platform may determine to not further analyze the first geographic point and the second geographic point as a candidate intersection point and can discard the first geographic point and the second geographic point.

Figure 2E:
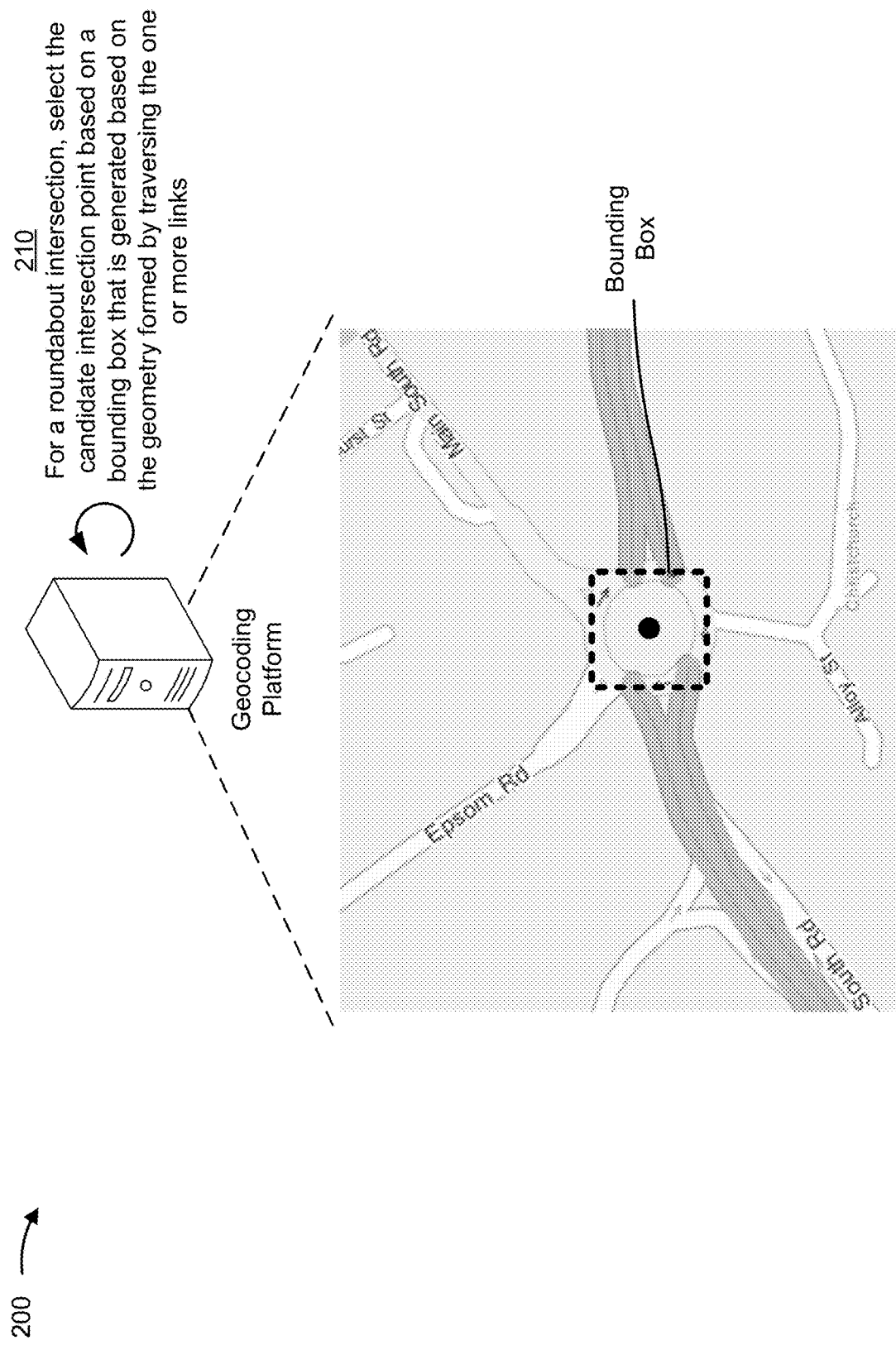

In some implementations, the geocoding platform can determine the geographic location of the intersection based on a type of intersection associated with the intersection of the first road and the second road. FIG. 2E illustrates an example technique that can be used to determine a candidate intersection point of a roundabout intersection type. As shown by reference number 210, the geocoding platform can select the candidate intersection point based on generating a bounding box around a path that is created by the one or more connecting links between the first geographic point and the second geographic point, and the geocoding platform can select the candidate intersection point as the center of the bounding box.

Figure 2F:
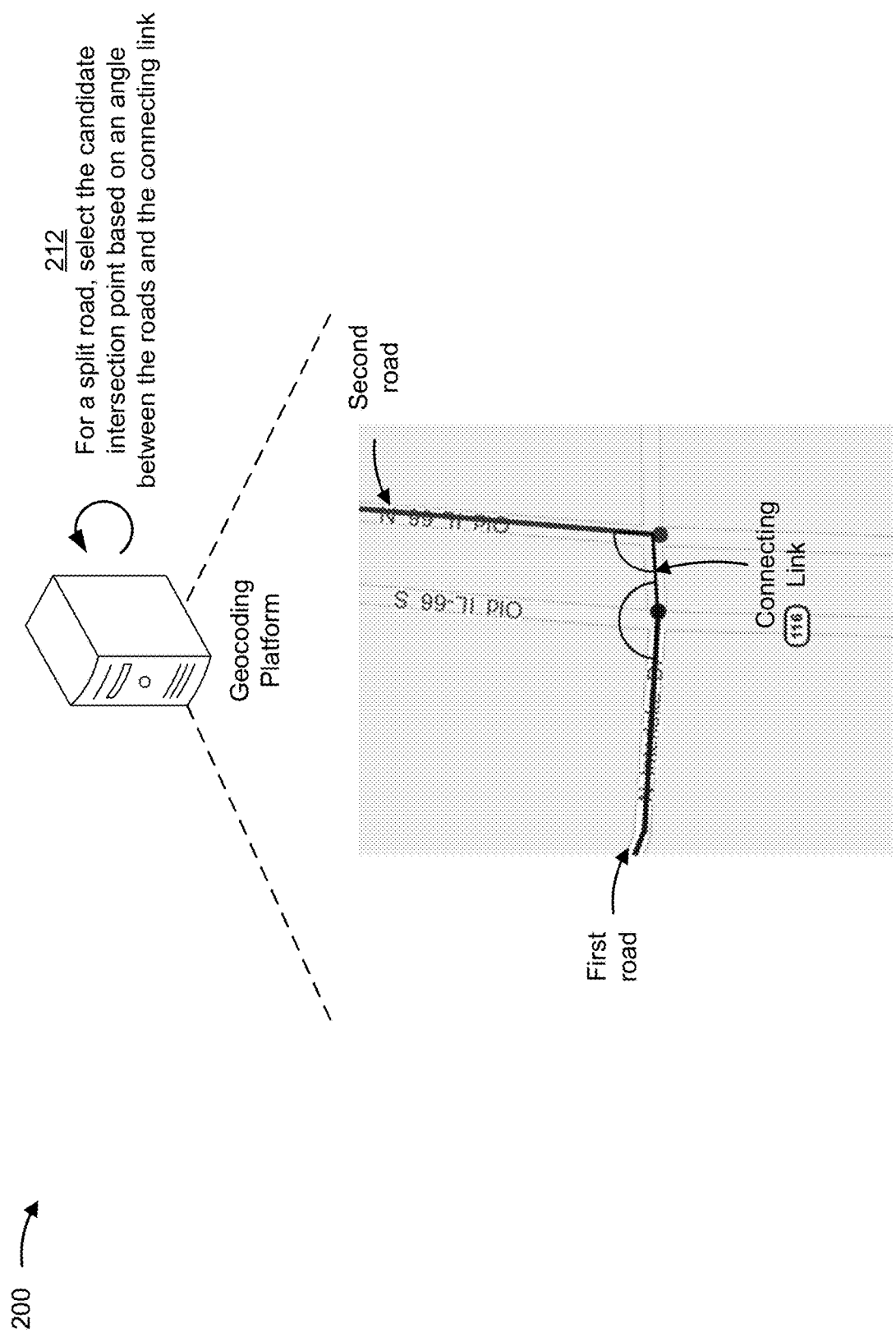

FIG. 2F illustrates an example technique that can be used to determine a candidate intersection point of a split road intersection type (e.g., an intersection involving a road where different directions of travel on the road are separated by a median and/or another geographic feature). As shown by reference number 212, the geocoding platform can select the candidate intersection point based on a first angle (e.g., a turning angle, which may be an angle of a turn from a particular road onto the connecting link) between the first road (N Interlake Dr) and a connecting link between the first road and the second road (Old IL-66 N), and a second angle between the second road and the connecting link. In some implementations, the geocoding platform can select, as the candidate intersection point, the geographic point associated with the road that has the greater angle relative to the connecting link. For example, as shown in FIG. 2F, the first angle between the first road and the connecting link may be a 0-degree turning angle, and the second angle between the second road and the connecting link may be a 90-degree turning angle, and the geocoding platform may accordingly select the geographic point associated with the second road as the candidate intersection point of the first road and the second road).

In this way, in cases where a common geographic point cannot be identified (e.g., where the first road and the second road can form a complex intersection and/or an indirect intersection (e.g., where the first road and the second road do not directly intersect), such as where the first road and the second road intersect via a roundabout, a split road, and/or the like, the geocoding platform can perform various techniques to process the query, which increases the functionality of the geocoding platform.

As indicated above, FIGS. 2A-2F are provided merely as an example. Other examples are possible and can differ from what was described with regard to FIGS. 2A-2F.

FIGS. 3A-3D are diagrams of an example implementation 300 described herein. As shown in FIGS. 3A-3D, implementation 300 can include various devices, such as a client device, a geocoding platform, and/or the like. In some implementations, the geocoding platform can be similar to, the same as, and/or implemented by, the geocoding platform described above with regard to FIGS. 1A-1J and/or FIGS. 2A-2F. In some implementations, FIGS. 3A-3D can further include a client device in communication with the geocoding platform.

In some implementations, implementation 300 can illustrate an implementation where the geocoding platform is to determine a geographic location of an intersection of a first road and a second road (e.g., Concord Turnpike and Alewife Brook Parkway) based on a plurality of candidate intersection points. In some implementations, the geocoding platform can receive a query for the intersection of Concord Turnpike and Alewife Brook Parkway, can parse the query to determine a first road (e.g., Concord Turnpike) and a second road (e.g., Alewife Brook Parkway), can generate one or more road segments for the first road and one or more road segments for the second road, and can identify a first plurality of geographic points along the first road segment and a second plurality of geographic points along the second road segment, as described above in reference to reference numbers 104-114.

Figure 3A:
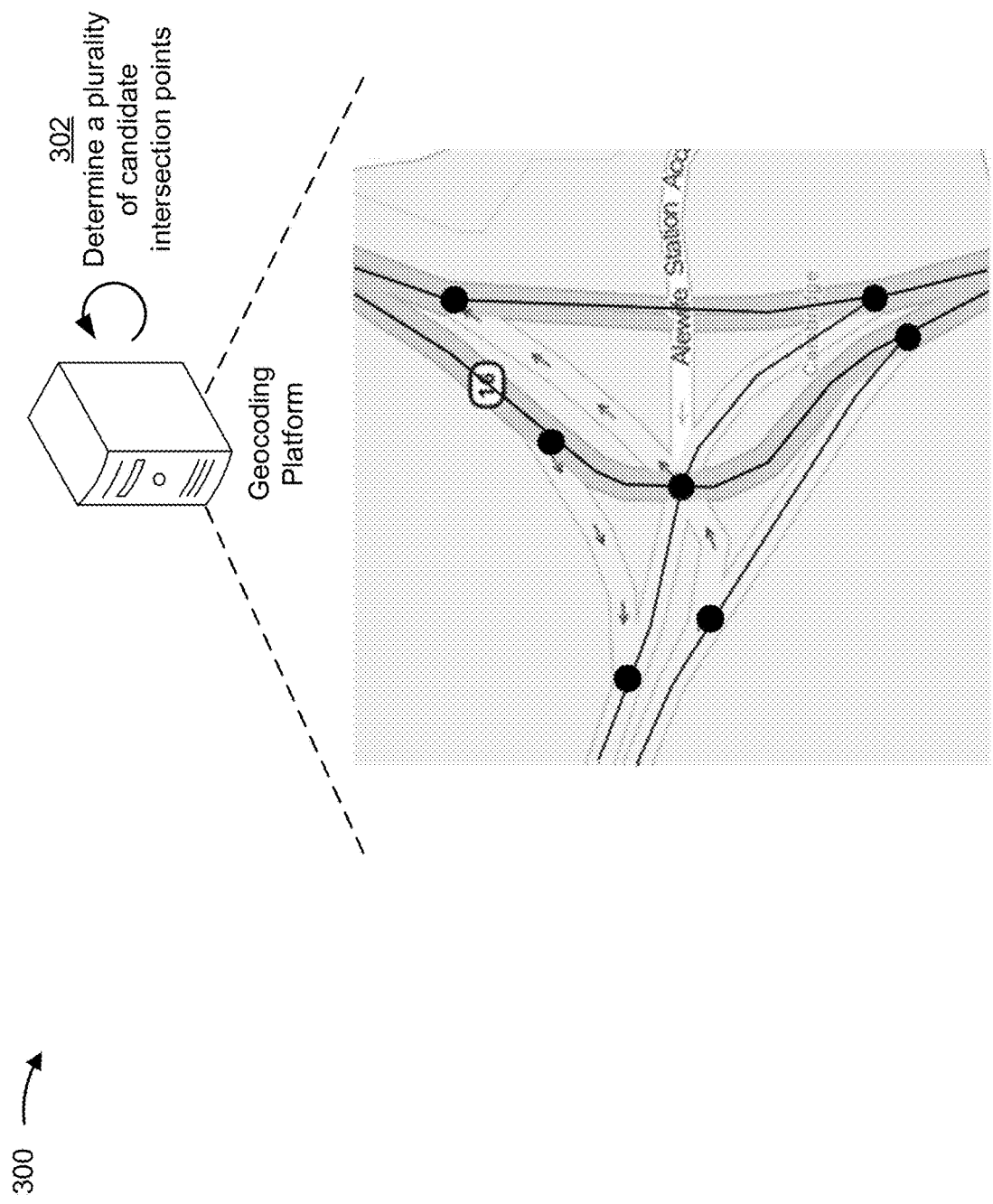
FIGS. 3A-3D are diagrams of an example implementation described herein.

Turning to FIG. 3A, and as shown by reference number 302, the geocoding platform can determine a plurality of candidate intersection points for the geographic location of the intersection of the first road and the second road. The plurality of candidate intersection points can include one or more common geographic points that are included in both the first plurality of geographic points and the second plurality of geographic points, as described above in connection with FIGS. 1A-1J, can include one or more direct intersection points, as described above in connection with FIGS. 1A-1F, can include one or more indirect intersection points, as described above in connection with FIGS. 2A-2F, and/or the like. For example, as illustrated in FIG. 3A, the geocoding platform can determine a plurality of candidate intersection points for the geographic location of the intersection of Concord Turnpike and Alewife Brook Parkway.

Figure 3B:
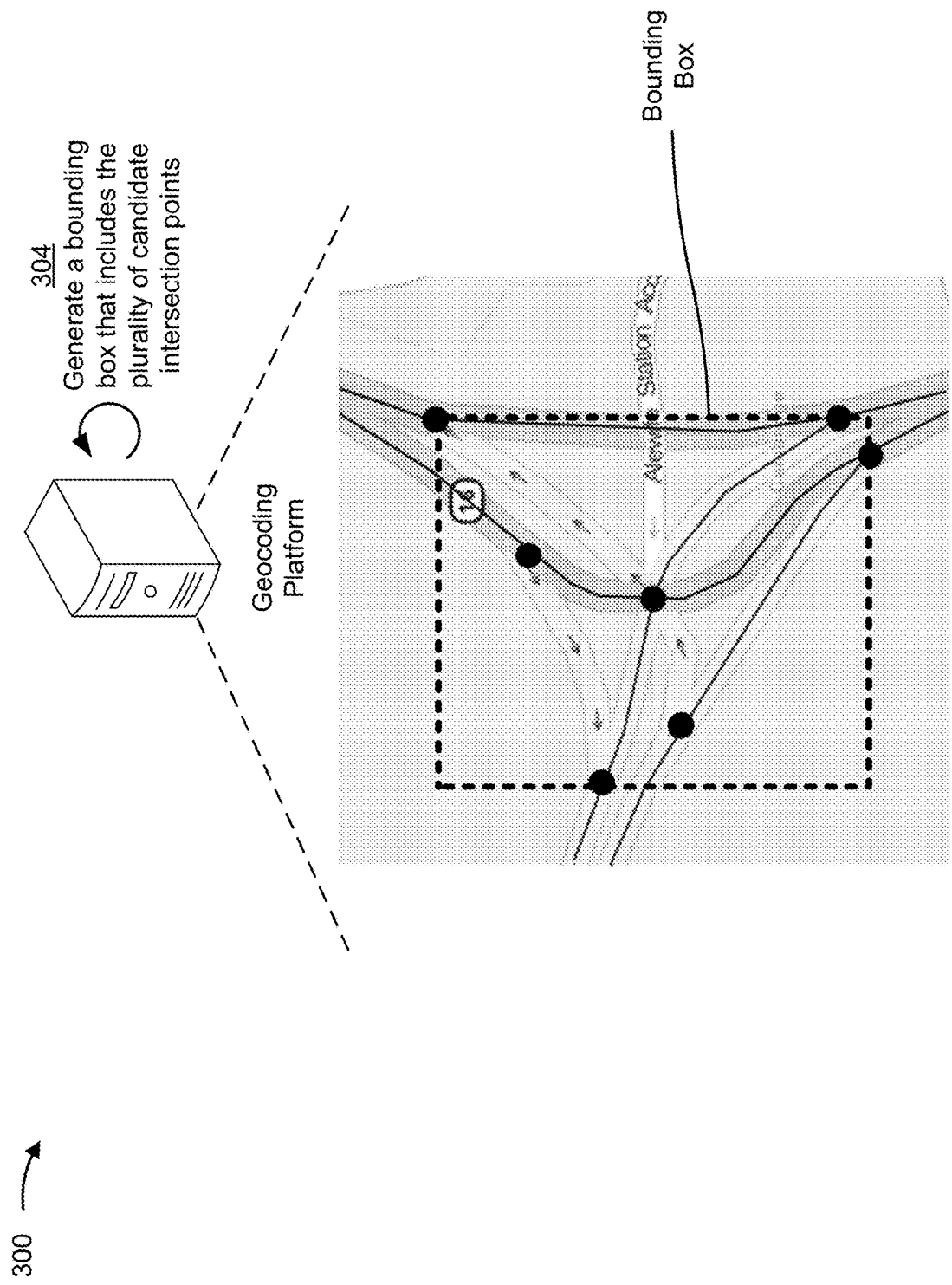

Turning to FIG. 3B, and as shown by reference number 304, the geocoding platform can generate a bounding box that includes the plurality of candidate intersection points. In some implementations, the bounding box can be another shape, such as a circle, a rectangle, and/or the like. In some implementations, the geocoding platform can select the shape that is used for the bounding box based on the layout of the plurality of candidate intersection points, based on the density of the candidate intersection points, based on user input, and/or the like.

In some implementations, the geocoding platform may perform various techniques for determining which candidate intersection points, of the plurality of candidate intersection points, to aggregate in the bounding box. For example, if the geocoding platform receives a search query for "Main St & 2nd Ave", the geocoding platform can identify many results in different cities. In other cases, the geocoding platform can identify multiple results within a smaller area. One technique may include using a distance threshold to determine whether to aggregate candidate intersection points (e.g., by repeatedly combining sets of candidate intersection points where a candidate intersection point from one set is within a distance threshold of another candidate intersection point from a second set, by adding candidate intersection points to a set of candidate intersection points where a new candidate intersection point is within a distance threshold of the center of the bounding box made by the set of points, and/or the like).

Another technique can include differing the distance threshold based on street metadata. For example, a larger distance threshold can be used for highway intersections where long ramps can be expected, whereas a smaller threshold can be used for intersections of more minor roads. Another technique can include selecting the candidate intersection points to aggregate based on inspecting the street network (e.g., by traversing connecting links between candidate points, possibly in combination with a distance threshold).

Figure 3C:
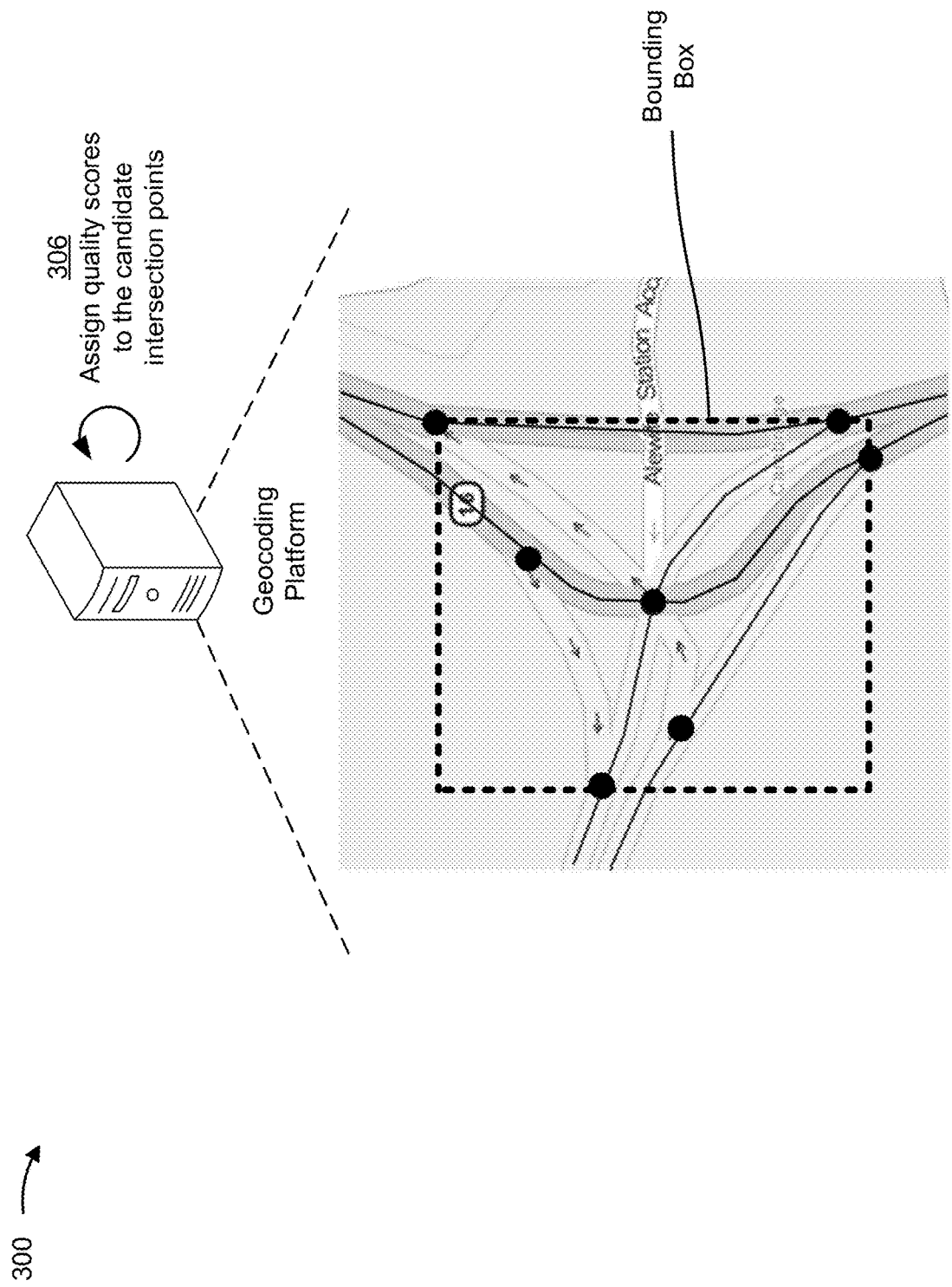

Turning to FIG. 3C, and as shown by reference number 306, the geocoding platform can assign a quality score to each candidate intersection point of the plurality of candidate intersection points. In some implementations, the geocoding platform can identify, as a high-quality candidate intersection point (e.g., a candidate intersection point with a relatively high quality score), a candidate intersection point that is a common geographic point included in both the first plurality of geographic points and the second plurality of geographic points. In some implementations, the geocoding platform can identify, as a low-quality candidate intersection point (e.g., a candidate intersection point with a relatively low quality score), a candidate intersection point that is an indirect intersection point. In some implementations, the geocoding platform may determine a quality score based on other factors, such as intersection type (e.g., a ramp entry intersection, a ramp exit intersection, a roundabout intersection, an internal intersection link, and/or the like).

Figure 3D:
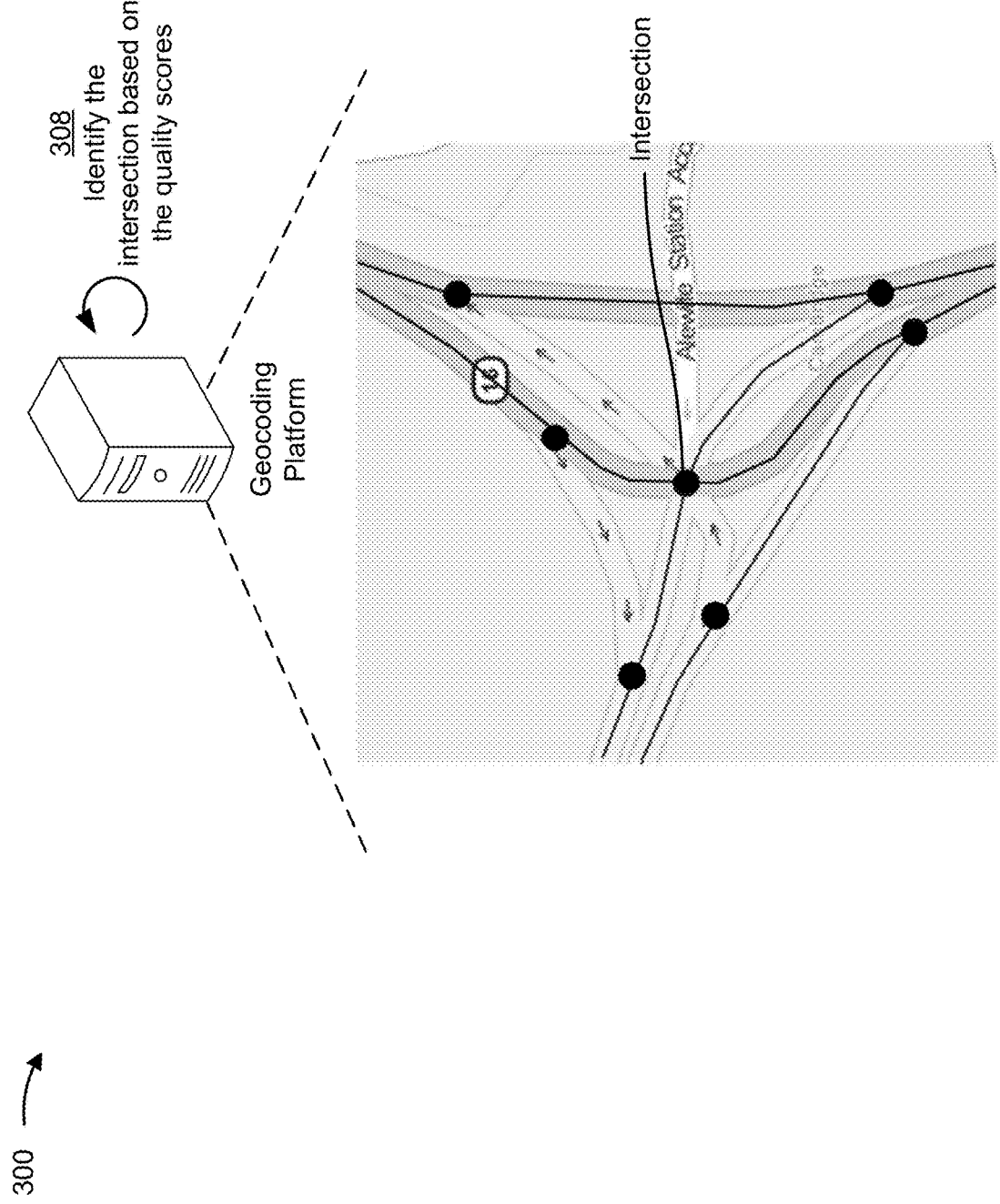

Turning to FIG. 3D, and as shown by reference number 308, the geocoding platform can select, as the intersection of the first road and the second road based on the quality scores assigned to the plurality of candidate intersection points. To do so, the geocoding platform can identify a first subset of candidate intersection points, of the plurality of candidate intersection points, that are assigned a quality score that satisfies a quality score threshold (e.g., that are determined to be high-quality candidate intersection points), and can identify a second subset of candidate intersection points, of the first subset of candidate intersection points (e.g., the candidate intersection points having quality scores that satisfy the quality score threshold), that are located within a distance from a first center of the bounding box that satisfies a distance threshold (e.g., within 100 geographic feet of the center of the first bounding box, within a percentage of the size of the bounding box, and/or the like). The geocoding platform can generate another bounding box around the second subset of candidate intersection points and use the location of the center of the other bounding box as the intersection.

In some implementations, if no candidate intersection points are included in the second subset of candidate intersection points, the geocoding platform can determine whether the bounding box, that includes the first subset of candidate intersection points, includes the center of the bounding box (i.e., there are high quality points on both sides of the center of the bounding box in any dimension), and can calculate the bounding box of all points in the first subset of candidate intersection points and use the center of the bounding box as the intersection.

In some implementations, if no candidate intersection points are included in the second subset of candidate intersection points, the geocoding platform can select the intersection as the center of the bounding box (i.e., the first bounding box). In some implementations, if no candidate intersection points are included in the second subset of candidate intersection points, the geocoding platform can identify the candidate intersection point that has the greatest quality score and is the closest to the center of the bounding box (i.e., the first bounding box), can generate a third subset of candidate intersection points that includes the candidate intersection point and any other candidate intersection points that are within a particular distance from the candidate intersection point, can generate another bounding box around the third subset of candidate intersection points, and can use the center of the other bounding box as the location of the intersection.

The geocoding platform can provide information, identifying the intersection of the first road and the second road, to the client device, as described above in reference to FIGS. 1A-1J. In this way, in cases where the geocoding identifies a plurality of candidate intersection points (e.g., where the intersection of the first road and the second road is a complex intersection), the geocoding platform can perform various techniques to select the intersection from the plurality of candidate intersection points, which increases the ability of the geocoding platform to process complex queries.

As indicated above, FIGS. 3A-3D are provided merely as an example. Other examples are possible and can differ from what was described with regard to FIGS. 3A-3D.

Figure 4:
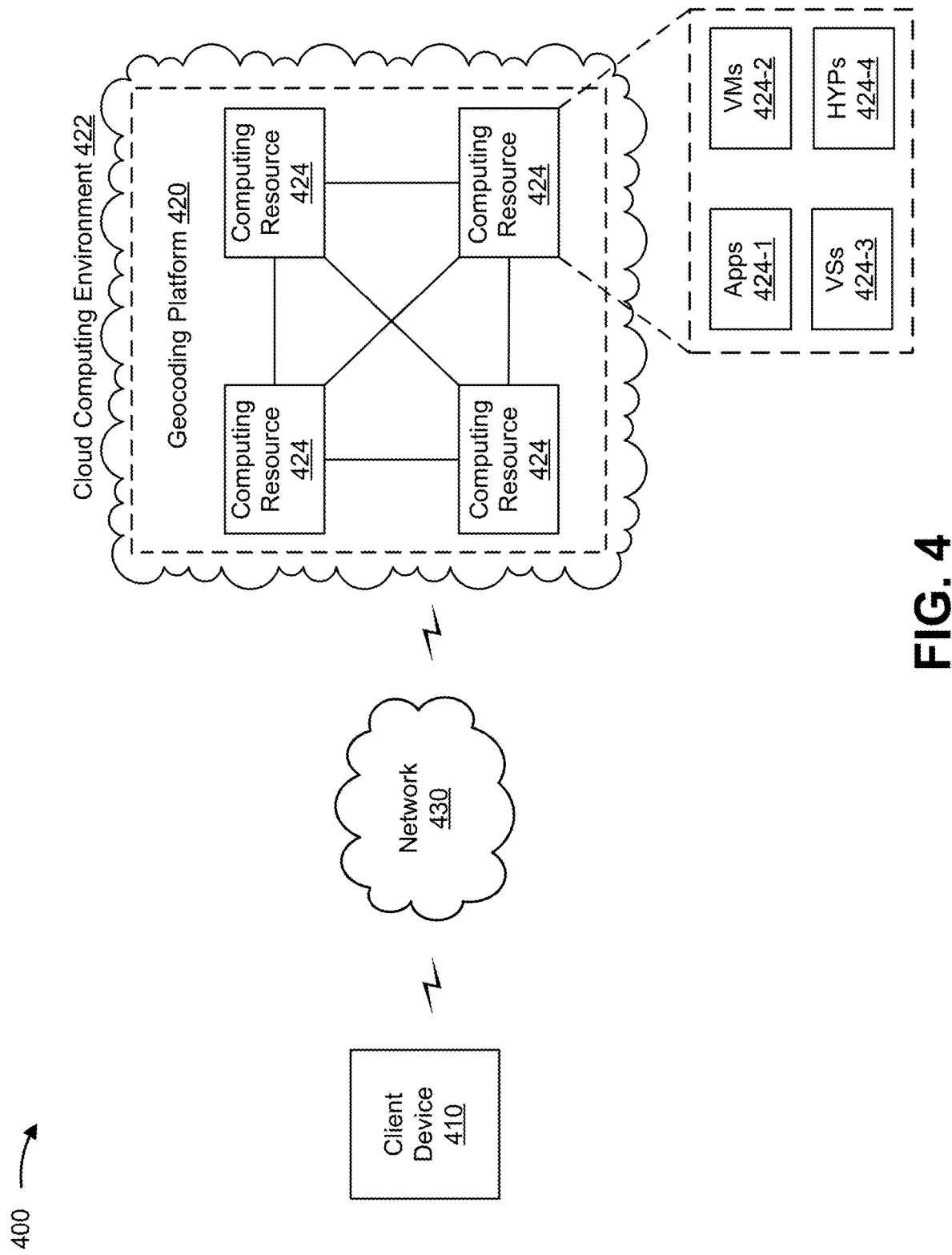
FIG. 4 is a diagram of an example environment in which systems and/or methods, described herein, can be implemented.

FIG. 4 is a diagram of an example environment 400 in which systems and/or methods, described herein, can be implemented. As shown in FIG. 4, environment 400 can include a client device 410, a geocoding platform 420 in a cloud computing environment 422 that includes a set of computing resources 424, and a network 430. Devices of environment 400 can interconnect via wired connections, wireless connections, or a combination of wired and wireless connections.

Client device 410 includes one or more devices capable of receiving, generating, storing, processing, and/or providing data associated with smart geocoding of road intersections. For example, client device 410 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a navigation device, an infotainment device, and/or a similar type of device. In some implementations, client device 410 can be a standalone device, can be included as part of a vehicle, and/or the like.

In some implementations, client device 410 can transmit a query to geocoding platform 420. In some implementations, client device 410 can receive information, identifying the intersection of the first road and the second road, from geocoding platform 420. In some implementations, client device 410 can present the information identifying the intersection of the first road and the second road. In some implementations, client device 410, can include a display device and can display a visual indicator of the intersection on a map, navigation directions to navigate to and/or navigate relative to the intersection, and/or the like. In some implementations, client device 410 can include a speaker device, and can play a voice command that describes the location of the intersection, directions to navigate to the intersection, directions to navigate relative to the intersection, and/or the like. In some implementations, client device 410 can use the information to automatically navigate a vehicle based on the information.

Geocoding platform 420 includes one or more devices capable of receiving, generating, storing, processing, and/or providing data associated with smart geocoding of road intersections. For example, geocoding platform 420 can receive a query from client device 410, can parse the query to determine a first road and a second road, can identify a first plurality of road segments associated with the first road and a second plurality of road segments associated with the second road, can determine a plurality of road segment pairs, wherein each road segment pair, of the plurality of road segment pairs, includes a first road segment of the first plurality of road segments and a second road segment of the second plurality of road segments. Geocoding platform 420 can, for each road segment pair, of the plurality of road segment pairs, identify a first plurality of geographic points along the first road segment, identify a second plurality of geographic points along the road segment, determine whether a common geographic point is included in both the first plurality of geographic points and the second plurality of geographic points, and select, based on determining that the common geographic point is included in both the first plurality of geographic points and the second plurality of geographic points, the common geographic point as a candidate intersection point of the first road and the second road (e.g., as described above in connection with FIGS. 1A-1J). In some implementations, geocoding platform 420 can determine that there is no common geographic point, can identify, based on determining that there is no common geographic point included in both the first plurality of geographic points and the second plurality of geographic points, one or more first points, of a plurality of points included in a grid, that are nearest a first geographic point among the first plurality of geographic points, can identify one or more second points, of the plurality of points, that are nearest a second geographic point, among the second plurality of geographic points, can determine whether a quantity of common points included in both the one or more first points and the one or more second points satisfies a threshold quantity of points, and can select the candidate intersection point based on determining that the quantity of common points included in both the one or more first points and the one or more second points satisfies the threshold quantity of points, as described above in connection with FIGS. 2A-2F. In some implementations, geocoding platform 420 can determine an intersection of the first road and the second road based on a plurality of candidate intersection points associated with the plurality of road segment pairs, as described above in connection with FIGS. 3A-3D. In some implementations, the geocoding platform can use a plurality of techniques together, in sequential order, based on determining that one or more of the plurality of techniques are unsuccessful, and/or the like. For example, the geocoding platform can receive a query for an intersection of a first road and a second road, can use a first technique for determining a direct intersection of the first road and the second road (e.g., as described above in connection with FIGS. 1A-1J), can use a second technique for determining an indirect intersection of the first road and the second road (e.g., as described above in connection with FIGS. 2A-2F) based on determining that the geocoding platform was unable to determine the intersection using the first technique, and/or the like. As another example, the geocoding platform can select a technique to use to determine an intersection of a first road and a second road based on performing initial processing to determine a type of intersection of the intersection between the first road and the second road (e.g., a direct intersection, an indirect intersection, a complex intersection, and/or the like).

In some implementations, as shown, geocoding platform 420 can be hosted in cloud computing environment 422. Notably, while implementations described herein describe geocoding platform 420 as being hosted in cloud computing environment 422, in some implementations, geocoding platform 420 may not be cloud-based (i.e., can be implemented outside of a cloud computing environment) or can be partially cloud-based.

Cloud computing environment 422 includes an environment that hosts geocoding platform 420. Cloud computing environment 422 can provide computation, software, data access, storage, and/or other services. As shown, cloud computing environment 422 can include a group of computing resources 424 (referred to collectively as "computing resources 424" and individually as "computing resource 424").

Computing resource 424 includes one or more personal computers, workstation computers, server devices, or another type of computation and/or communication device. In some implementations, computing resource 424 can host geocoding platform 420. The cloud resources can include compute instances executing in computing resource 424, storage devices provided in computing resource 424, data transfer devices provided by computing resource 424, etc. In some implementations, computing resource 424 can communicate with other computing resources 424 via wired connections, wireless connections, or a combination of wired and wireless connections.

As further shown in FIG. 4, computing resource 424 can include a group of cloud resources, such as one or more applications ("APPs") 424-1, one or more virtual machines ("VMs") 424-2, one or more virtualized storages ("VSs") 424-3, or one or more hypervisors ("HYPs") 424-4.

Application 424-1 includes one or more software applications that can be provided to or accessed by one or more devices of environment 400. Application 424-1 can eliminate a need to install and execute the software applications on devices of environment 400. For example, application 424-1 can include software associated with geocoding platform 420 and/or any other software capable of being provided via cloud computing environment 422. In some implementations, one application 424-1 can send/receive information to/from one or more other applications 424-1, via virtual machine 424-2. In some implementations, application 424-1 can include a software application associated with one or more databases and/or operating systems. For example, application 424-1 can include an enterprise application, a functional application, an analytics application, and/or the like.

Virtual machine 424-2 includes a software implementation of a machine (e.g., a computer) that executes programs like a physical machine. Virtual machine 424-2 can be either a system virtual machine or a process virtual machine, depending upon use and degree of correspondence to any real machine by virtual machine 424-2. A system virtual machine can provide a complete system platform that supports execution of a complete operating system ("OS"). A process virtual machine can execute a single program, and can support a single process. In some implementations, virtual machine 434-2 can execute on behalf of a user (e.g., a user of client device 410 and/or the like), and can manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 424-4 provides hardware virtualization techniques that allow multiple operating systems (e.g., "guest operating systems") to execute concurrently on a host computer, such as computing resource 424. Hypervisor 424-4 can present a virtual operating platform to the guest operating systems, and can manage the execution of the guest operating systems. Multiple instances of a variety of operating systems can share virtualized hardware resources.

Network 430 includes one or more wired and/or wireless networks. For example, network 430 can include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there can be additional devices and/or networks, fewer devices and/or networks, different devices and/or networks, or differently arranged devices and/or networks than those shown in FIG. 4. Furthermore, two or more devices shown in FIG. 4 can be implemented within a single device, or a single device shown in FIG. 4 can be implemented as multiple, distributed devices. Additionally, or alternatively, a set of devices (e.g., one or more devices) of environment 400 can perform one or more functions described as being performed by another set of devices of environment 400. For example, client device 410 and geocoding platform 420 may be implemented by the same device or set of devices, geocoding platform 420 may be implemented on client device 410 (e.g., as one or more applications executed by a memory and a processor), and/or the like.

Figure 5:
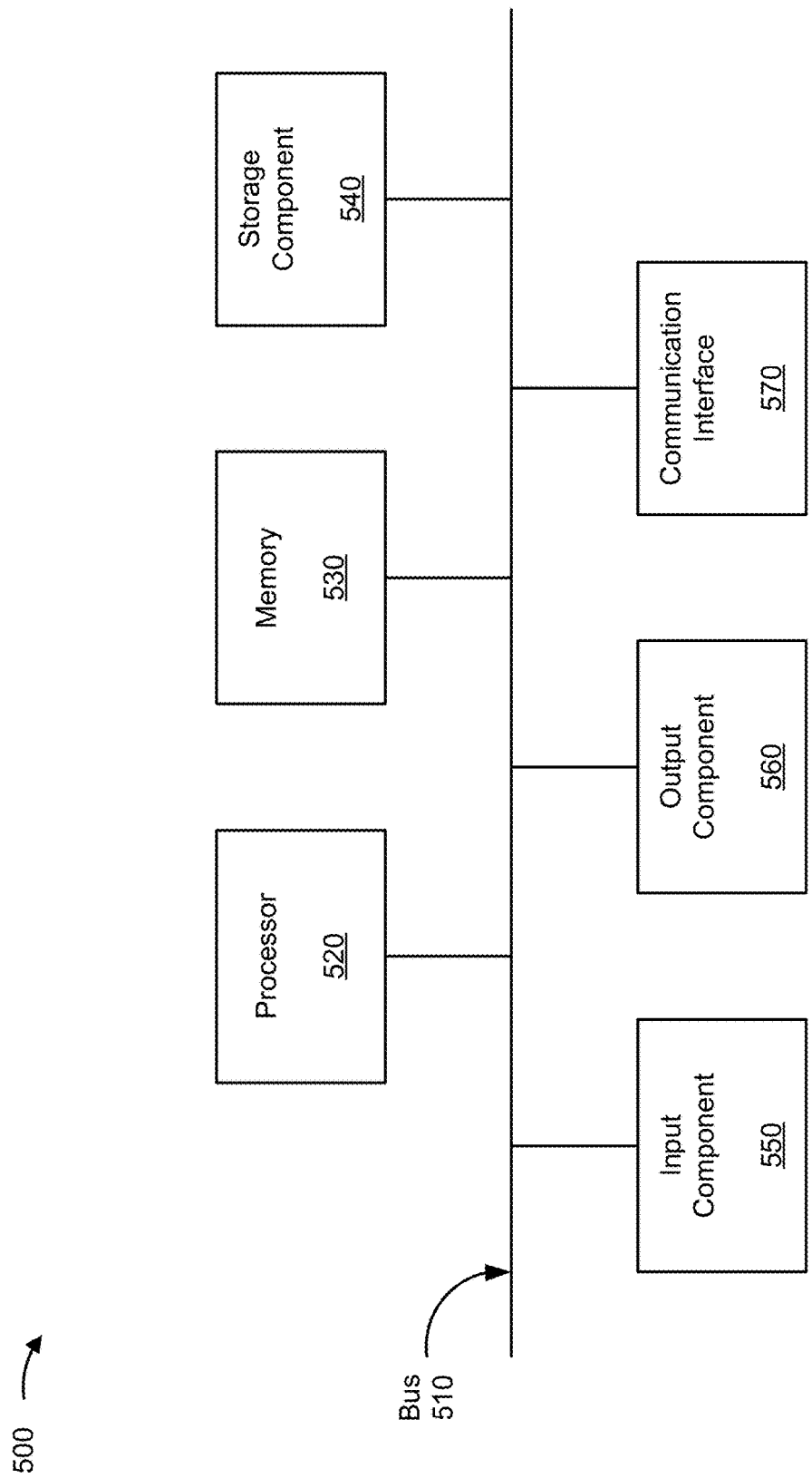
FIG. 5 is a diagram of example components of one or more devices of FIG. 4.

FIG. 5 is a diagram of example components of a device 500. Device 500 can correspond to client device 410, geocoding platform 420, computing resource 425, and/or one or more devices included in network 430. In some implementations client device 410, geocoding platform 420, computing resource 425, and/or one or more devices included in network 430 can include one or more devices 500 and/or one or more components of device 500. As shown in FIG. 5, device 500 can include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 can include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 can permit device 500 to receive information from another device and/or provide information to another device. For example, communication interface 570 can include an Ethernet interface, an optical interface, a coaxial interface, an infrared interface, a radio frequency (RF) interface, a universal serial bus (USB) interface, a wireless local area network interface, a cellular network interface, or the like.

Device 500 can perform one or more processes described herein. Device 500 can perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions can be read into memory 530 and/or storage component 540 from another computer-readable medium or from another device via communication interface 570. When executed, software instructions stored in memory 530 and/or storage component 540 can cause processor 520 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 can include additional components, fewer components, different components, or differently arranged components than those shown in FIG. 5. Additionally, or alternatively, a set of components (e.g., one or more components) of device 500 can perform one or more functions described as being performed by another set of components of device 500.

Figure 6A:
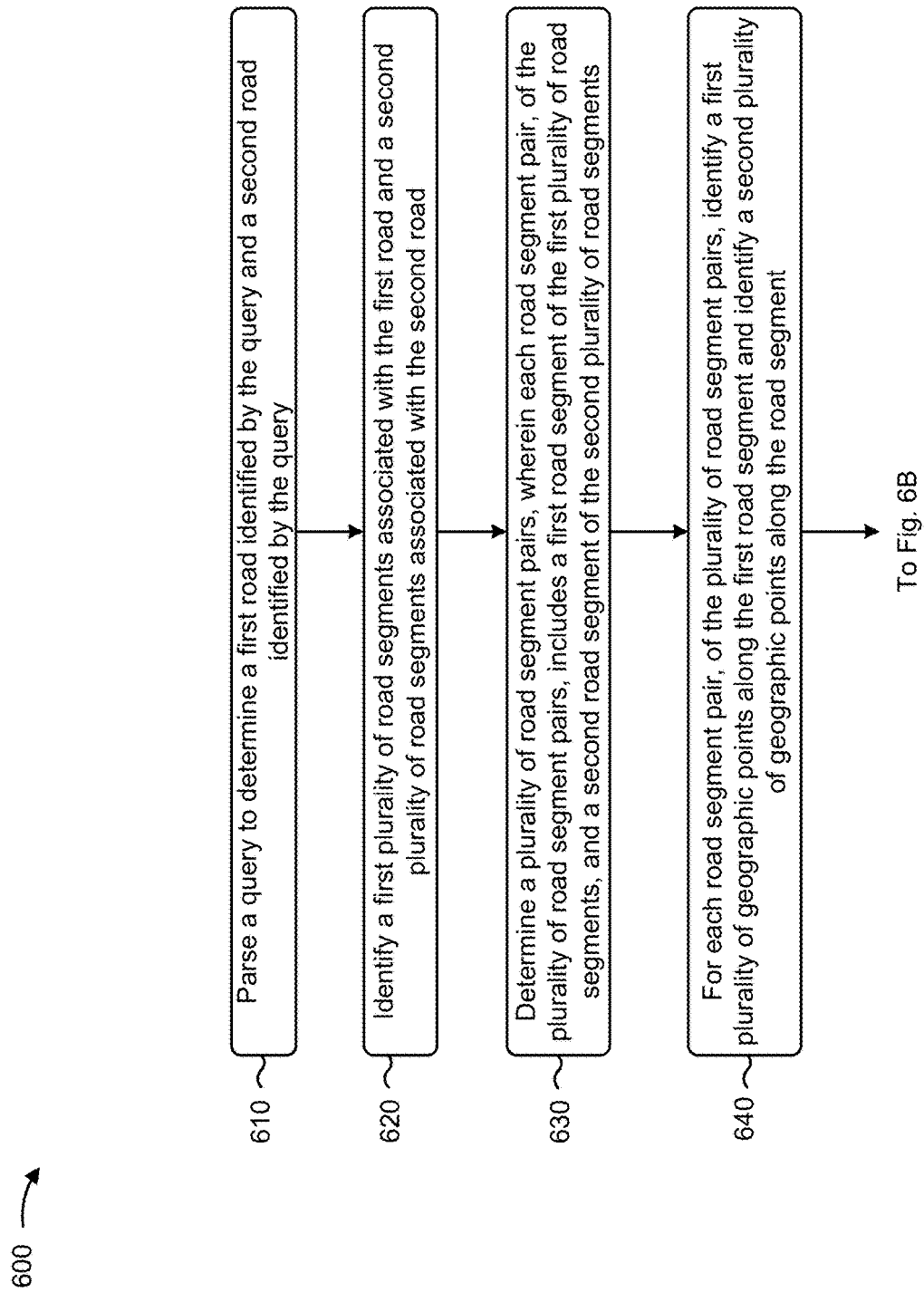

FIGS. 6A and 6B are a flow chart of an example process 600 for smart geocoding of road intersections. In some implementations, one or more process blocks of FIGS. 6A and/or 6B can be performed by a geocoding platform (e.g., geocoding platform 420). In some implementations, one or more process blocks of FIGS. 6A and/or 6B can be performed by another device or a group of devices separate from or including the geocoding platform, such as a client device (e.g., client device 410).

As shown in FIG. 6A, process 600 can include parsing a query to determine a first road identified by the query and a second road identified by the query (block 610). For example, the geocoding platform (e.g., using computing resource 425, processor 520, memory 530, storage component 540, input component 550, communication interface 570, and/or the like) can parse a query to determine a first road identified by the query and a second road identified by the query, as described above.

As further shown in FIG. 6A, process 600 can include identifying a first plurality of road segments associated with the first road and a second plurality of road segments associated with the second road (block 620). For example, the geocoding platform (e.g., using computing resource 425, processor 520, memory 530, storage component 540, and/or the like) can identify a first plurality of road segments associated with the first road and a second plurality of road segments associated with the second road, as described above.

As further shown in FIG. 6A, process 600 can include determining a plurality of road segment pairs, wherein each road segment pair, of the plurality of road segment pairs, includes a first road segment of the first plurality of road segments, and a second road segment of the second plurality of road segments (block 630). For example, the geocoding platform (e.g., using computing resource 425, processor 520, memory 530, storage component 540, and/or the like) can determine a plurality of road segment pairs, as described above. In some implementations, each road segment pair, of the plurality of road segment pairs, includes a first road segment of the first plurality of road segments, and a second road segment of the second plurality of road segments.

As further shown in FIG. 6A, process 600 can include, for each road segment pair, of the plurality of road segment pairs, identifying a first plurality of geographic points along the first road segment and identifying a second plurality of geographic points along the road segment (block 640). For example, the geocoding platform (e.g., using computing resource 425, processor 520, memory 530, storage component 540, and/or the like) can, for each road segment pair, of the plurality of road segment pairs, identify a first plurality of geographic points along the first road segment and identify a second plurality of geographic points along the road segment, as described above.

As further shown in FIG. 6B, process 600 can include determining whether a common geographic point is included in both the first plurality of geographic points and the second plurality of geographic points (block 650). For example, the geocoding platform (e.g., using computing resource 425, processor 520, memory 530, storage component 540, and/or the like) can determine whether a common geographic point is included in both the first plurality of geographic points and the second plurality of geographic points, as described above.

As further shown in FIG. 6B, process 600 can include selecting, based on determining that the common geographic point is included in both the first plurality of geographic points and the second plurality of geographic points (block 650—Yes), the common geographic point as a candidate intersection point of the first road and the second road (block 660). For example, the geocoding platform (e.g., using computing resource 425, processor 520, memory 530, storage component 540, and/or the like) can select, based on determining that the common geographic point is included in both the first plurality of geographic points and the second plurality of geographic points, the common geographic point as a candidate intersection point of the first road and the second road, as described above.

As further shown in FIG. 6B, process 600 can include selecting, if the common geographic point is not included in both the first plurality of geographic points and the second plurality of geographic points (block 650—No), the candidate intersection point based on an indirect intersection determination method (block 670). For example, the geocoding platform (e.g., using computing resource 425, processor 520, memory 530, storage component 540, and/or the like) can select, if a common geographic point is not included in both the first plurality of geographic points and the second plurality of geographic points, the candidate intersection point based on an indirect intersection determination method, as described above.

As further shown in FIG. 6B, process 600 can include determining an intersection of the first road and the second road based on a plurality of candidate intersection points associated with the plurality of road segment pairs (block 680). For example, the geocoding platform (e.g., using computing resource 425, processor 520, memory 530, storage component 540, output component 560, communication interface 570, and/or the like) can determine an intersection of the first road and the second road based on a plurality of candidate intersection points associated with the plurality of road segment pairs, as described above.

As further shown in FIG. 6B, process 600 can include providing, to a client device, information identifying the intersection of the first road and the second road (block 690). For example, the geocoding platform (e.g., using computing resource 425, processor 520, memory 530, storage component 540, output component 560, communication interface 570, and/or the like) can provide, to a client device, information identifying the intersection of the first road and the second road, as described above.

Process 600 can include additional implementations, such as any single implementation or any combination of implementations described below and/or in connection with one or more other processes described elsewhere herein.

In some implementations, the geocoding platform can identify, based on determining that there is no common geographic point included in both the first plurality of geographic points and the second plurality of geographic points, one or more first points, of a plurality of points included in a grid, that are nearest a first geographic point, among the first plurality of geographic points, wherein the grid is represented by an algorithm, algebraic expression, and/or the like, can identify one or more second points, of the plurality of points, that are nearest a second geographic point, among the second plurality of geographic points, can determine whether a quantity of common points included in both the one or more first points and the one or more second points satisfies a threshold quantity of points, and can select the intersection of the first road and the second road based on determining that the quantity of common points included in both the one or more first points and the one or more second points satisfies the threshold quantity of points.

In some implementations, when selecting the intersection of the first road and the second road based on determining that the quantity of common points included in both the one or more first points and the one or more second points satisfies the threshold quantity of points, the geocoding platform can identify a connecting link between the first road, and can select the intersection of the first road and the second road based on a first angle between the connecting link and the first road, and a second angle between the connecting link and the second road.

In some implementations, when selecting the common geographic point as the intersection of the first road and the second road, the geocoding platform can aggregate the plurality of candidate intersection points into intersections that can be assigned confidence scores that can be influenced by intersection type.

In some implementations, the confidence score, assigned to the plurality of candidate intersection points aggregated into an intersection, can be based at least in part on an intersection type associated with each intersection, wherein the intersection type comprises at least one of a cross-road intersection of the first road segment and the second road segment, a merge of the first road and the second road into a common road, or an internal intersection of a merged road segment of the first road segment and the second road segment.

In some implementations, when determining the intersection of the first road and the second road, the geocoding platform can generate a first bounding box that includes the plurality of candidate intersection points, can assign, to each candidate intersection point, of the plurality of candidate intersection points associated with the plurality of road segment pairs, a quality score, can identify a first subset of candidate intersection points, of the plurality of candidate intersection points, that are assigned a quality score that satisfies a quality score threshold, can identify a second subset of candidate intersection points, of the first subset of candidate intersection points, that are located within a first distance from a first center of the first bounding box that satisfies a first distance threshold, and if a quantity of the second subset of candidate intersection points is zero, can generate a second bounding box around the first subset of candidate intersection points, if the first center of the first bounding box is included in the second bounding box, can select a first location of the second center of the second bounding box as the intersection of the first road and the second road, or if the first center of the first bounding box is not included in the second bounding box, can identify a first point from the first subset of candidate intersection points that is closest to the first center of the first bounding box, can identify a third subset of candidate intersection points, of the first subset of candidate intersection points, that are located within a second distance from this point that satisfies a second distance threshold, can generate a third bounding box around the third subset of candidate intersection points, and can select a second location of the center of the third bounding box as the intersection of the first road and the second road, or if the quantity of the second subset of candidate intersection points is greater than zero, can generate the second bounding box around the second subset of candidate intersection points and can elect the first location of the center of the second bounding box as the intersection of the first road and the second road.

Although FIGS. 6A and 6B show example blocks of process 600, in some implementations, process 600 can include additional blocks, fewer blocks, different blocks, or differently arranged blocks than those depicted in FIGS. 6A and 6B. Additionally, or alternatively, two or more of the blocks of process 600 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   parsing, by a device, a query to determine a first road identified by the query and a second road identified by the query;
   identifying, by the device, a first plurality of road segments associated with the first road and a second plurality of road segments associated with the second road;
   determining, by the device, a plurality of road segment pairs,
      wherein each road segment pair, of the plurality of road segment pairs, includes:
         a first road segment of the first plurality of road segments, and
         a second road segment of the second plurality of road segments;
   for each road segment pair, of the plurality of road segment pairs:
      identifying, by the device, a first plurality of geographic points along the first road segment;
      identifying, by the device, a second plurality of geographic points along the road segment;
      determining, by the device, whether a common geographic point is included in both the first plurality of geographic points and the second plurality of geographic points; and
      selecting, by the device and based on determining that the common geographic point is included in both the first plurality of geographic points and the second plurality of geographic points, the common geographic point as a candidate intersection point of the first road and the second road;
   determining, by the device, an intersection of the first road and the second road based on a plurality of candidate intersection points associated with the plurality of road segment pairs and based on a confidence score assigned to an intersection type, of a plurality of intersection types, associated with the intersection of the first road and the second road,
      wherein each intersection type, of the plurality of intersection types, is assigned a respective confidence score; and
   providing, by the device and to a client device, information identifying the intersection of the first road and the second road.

2. The method of claim 1, further comprising:
   identifying, based on determining that no common geographic point is included in both the first plurality of geographic points and the second plurality of geographic points, one or more first points, of a plurality of points included in a grid, that are nearest a first geographic point among the first plurality of geographic points,
      wherein the grid is represented by an algorithm identifying one or more second points, of the plurality of points, that are nearest a second geographic point, among the second plurality of geographic points;
   determining whether a quantity of common points included in both the one or more first points and the one or more second points satisfies a threshold quantity of points; and
   selecting the candidate intersection point based on determining that the quantity of common points included in both the one or more first points and the one or more second points satisfies the threshold quantity of points.

3. The method of claim 2, wherein selecting the candidate intersection point based on determining that the quantity of common points included in both the one or more first points and the one or more second points satisfies the threshold quantity of points comprises:
   determining that the first road and the second road intersect at a roundabout; and
   selecting the candidate intersection point based on traversing one or more connecting links, via the roundabout, between the first geographic point and the second geographic point.

4. The method of claim 2, wherein selecting the candidate intersection point based on determining that the quantity of common points included in both the one or more first points and the one or more second points satisfies the threshold quantity of points comprises:
   identifying a connecting link between the first road and the second road; and
   selecting the candidate intersection point of the first road and the second road based on:
      a first angle between the connecting link and the first road, and a second angle between the connecting link and the second road.

5. The method of claim 1, wherein determining the intersection of the first road and the second road comprises:
aggregating the plurality of candidate intersection points; and
assigning the confidence score to the aggregation of the plurality of candidate intersection points.

6. The method of claim 1, wherein the plurality of intersection types comprise at least two of:
a cross-road intersection of the first road segment and the second road segment,
a merge of the first road and the second road into a common road, or
an internal intersection of a merged road segment of the first road segment and the second road segment.

7. The method of claim 1, wherein determining the intersection of the first road and the second road comprises:
generating a first bounding box that includes the plurality of candidate intersection points;
assigning, to each candidate intersection point, of the plurality of candidate intersection points associated with the plurality of road segment pairs, a quality score;
identifying a first subset of candidate intersection points, of the plurality of candidate intersection points, that are assigned a quality score that satisfies a quality score threshold;
identifying a second subset of candidate intersection points, of the first subset of candidate intersection points, that are located within a first distance from a first center of the first bounding box that satisfies a first distance threshold; and
when a quantity of the second subset of candidate intersection points is zero:
generating a second bounding box around the first subset of candidate intersection points; and
when the first center of the first bounding box is included in the second bounding box:
selecting a first location of a second center of the second bounding box as the intersection of the first road and the second road, or
when the first center of the first bounding box is not included in the second bounding box:
identifying a first point from the first subset of candidate intersection points that is closest to the first center of the first bounding box;
identifying a third subset of candidate intersection points, of the first subset of candidate intersection points, that are located within a second distance from the first point that satisfies a second distance threshold;
generating a third bounding box around the third subset of candidate intersection points; and
selecting a second location of a center of the third bounding box as the intersection of the first road and the second road, or
when the quantity of the second subset of candidate intersection points is greater than zero:
generating the second bounding box around the second subset of candidate intersection points; and
selecting the second location of the second center of the second bounding box as the intersection of the first road and the second road.

8. A device, comprising:
one or more memories; and
one or more processors, communicatively coupled to the one or more memories, to:
parse a query to determine a first road identified by the query and a second road identified by the query;
identify a first plurality of road segments associated with the first road and a second plurality of road segments associated with the second road;
determine a plurality of road segment pairs,
wherein each road segment pair, of the plurality of road segment pairs, includes:
a first road segment of the first plurality of road segments, and
a second road segment of the second plurality of road segments;
for each road segment pair, of the plurality of road segment pairs:
identify a first plurality of geographic points along the first road segment;
identify a second plurality of geographic points along the road segment;
determine whether a common geographic point is included in both the first plurality of geographic points and the second plurality of geographic points; and
select, based on determining that the common geographic point is included in both the first plurality of geographic points and the second plurality of geographic points, the common geographic point as a candidate intersection point of the first road and the second road;
determine an intersection of the first road and the second road based on a plurality of candidate intersection points associated with the plurality of road segment pairs and based on a confidence score assigned to an intersection type, of a plurality of intersection types, associated with the intersection of the first road and the second road,
wherein each intersection type, of the plurality of intersection types, is assigned a respective confidence score; and
provide, to a client device, information identifying the intersection of the first road and the second road.

9. The device of claim 8, wherein the one or more processors are further configured to:
identify, based on determining that no common geographic point is included in both the first plurality of geographic points and the second plurality of geographic points, one or more first points, of a plurality of points included in a grid, that are nearest a first geographic point among the first plurality of geographic points,
wherein the grid is represented by an algorithm;
identify one or more second points, of the plurality of points, that are nearest a second geographic point, among the second plurality of geographic points;
determine whether a quantity of common points included in both the one or more first points and the one or more second points satisfies a threshold quantity of points; and
select the candidate intersection point based on determining that the quantity of common points included in both the one or more first points and the one or more second points satisfies the threshold quantity of points.

10. The device of claim 9, wherein the one or more processors, when selecting the candidate intersection point based on determining that the quantity of common points included in both the one or more first points and the one or more second points satisfies the threshold quantity of points, are to:

determine that the first road and the second road intersect at a roundabout; and
select the candidate intersection point of the first road and the second road based on traversing one or more connecting links, via the roundabout, between the first geographic point and the second geographic point.

11. The device of claim 9, wherein the one or more processors, when selecting the candidate intersection point based on determining that the quantity of common points included in both the one or more first points and the one or more second points satisfies the threshold quantity of points, are to:
identify a connecting link between the first road and the second road; and
select the candidate intersection point of the first road and the second road based on:
a first angle between the connecting link and the first road, and
a second angle between the connecting link and the second road.

12. The device of claim 8, wherein the one or more processors, when determining the intersection of the first road and the second road, are to:
aggregate the plurality of candidate intersection points; and
assign the confidence score to the aggregation of the plurality of candidate intersection points.

13. The device of claim 8, wherein the plurality of intersection types comprise at least two of:
a cross-road intersection of the first road segment and the second road segment,
a merge of the first road and the second road into a common road, or
an internal intersection of a merged road segment of the first road segment and the second road segment.

14. The device of claim 8, wherein the one or more processors, when determining the intersection of the first road and the second road, are to:
generate a first bounding box that includes the plurality of candidate intersection points;
assign, to each candidate intersection point, of the plurality of candidate intersection points associated with the plurality of road segment pairs, a quality score;
identify a first subset of candidate intersection points, of the plurality of candidate intersection points, that are assigned a quality score that satisfies a quality score threshold;
identify a second subset of candidate intersection points, of the first subset of candidate intersection points, that are located within a first distance from a first center of the first bounding box that satisfies a first distance threshold; and
when a quantity of the second subset of candidate intersection points is zero:
generate a second bounding box around the first subset of candidate intersection points; and
when the first center of the first bounding box is included in the second bounding box:
select a first location of a second center of the second bounding box as the intersection of the first road and the second road, or
when the first center of the first bounding box is not included in the second bounding box:
identify a first point from the first subset of candidate intersection points that is closest to the first center of the first bounding box;
identify a third subset of candidate intersection points, of the first subset of candidate intersection points, that are located within a second distance from the first point that satisfies a second distance threshold;
generate a third bounding box around the third subset of candidate intersection points; and
select a second location of a center of the third bounding box as the intersection of the first road and the second road, or
when the quantity of the second subset of candidate intersection points is greater than zero:
generate the second bounding box around the second subset of candidate intersection points; and
select the first location of the second center of the second bounding box as the intersection of the first road and the second road.

15. A non-transitory computer-readable medium storing instructions, the instructions comprising:
one or more instructions that, when executed by one or more processors of a device, cause the one or more processors to:
identify a first plurality of road segments associated with a first road and a second plurality of road segments associated with a second road;
determine a plurality of road segment pairs,
wherein each road segment pair, of the plurality of road segment pairs, includes:
a first road segment of the first plurality of road segments, and
a second road segment of the second plurality of road segments;
for each road segment pair, of the plurality of road segment pairs:
identify a first plurality of geographic points along the first road segment;
identify a second plurality of geographic points along the road segment;
determine whether a common geographic point is included in both the first plurality of geographic points and the second plurality of geographic points; and
select, based on determining that the common geographic point is included in both the first plurality of geographic points and the second plurality of geographic points, the common geographic point as a candidate intersection point of the first road and the second road;
determine an intersection of the first road and the second road based on a plurality of candidate intersection points associated with the plurality of road segment pairs and based on a confidence score assigned to an intersection type, of a plurality of intersection types, associated with the intersection of the first road and the second road,
wherein each intersection type, of the plurality of intersection types, is assigned a respective confidence score; and
provide, to a client device, information identifying the intersection of the first road and the second road.

16. The non-transitory computer-readable medium of claim 15, wherein the one or more instructions, when executed by the one or more processors, further cause the one or more processors to:
identify, based on determining that no common geographic point is included in both the first plurality of geographic points and the second plurality of geographic points, one or more first points, of a plurality of points included in a grid, that are nearest a first geographic point among the first plurality of geographic points, wherein the grid is represented by an algorithm;

identify one or more second points, of the plurality of points, that are nearest a second geographic point, among the second plurality of geographic points;

determine whether a quantity of common points included in both the one or more first points and the one or more second points satisfies a threshold quantity of points; and select the candidate intersection point based on determining that the quantity of common points included in both the one or more first points and the one or more second points satisfies the threshold quantity of points.

17. The non-transitory computer-readable medium of claim 16, wherein the one or more instructions, that cause the one or more processors to select the candidate intersection point based on determining that the quantity of common points included in both the one or more first points and the one or more second points satisfies the threshold quantity of points, cause the one or more processors to:

determine that the first road and the second road intersect at a roundabout; and select the candidate intersection point based on traversing one or more connecting links, via the roundabout, between the first geographic point and the second geographic point.

18. The non-transitory computer-readable medium of claim 16, wherein the one or more instructions that cause the one or more processors to select the candidate intersection point based on determining that the quantity of common points included in both the one or more first points and the one or more second points satisfies the threshold quantity of points, cause the one or more processors to:

identify a connecting link between the first road and the second road;

select the candidate intersection point of the first road and the second road based:
  a first angle between the connecting link and the first road, and
  a second angle between the connecting link and the second road.

19. The non-transitory computer-readable medium of claim 15, wherein the one or more instructions that cause the one or more processors to determine the intersection of the first road and the second road, cause the one or more processors to:

aggregate the plurality of candidate intersection points; and assign the confidence score to the aggregation of the plurality of candidate intersection points.

20. The non-transitory computer-readable medium of claim 15, wherein the one or more instructions, that cause the one or more processors to determine the intersection of the first road and the second road, cause the one or more processors to:

generate a first bounding box that includes the plurality of candidate intersection points;

assign, to each candidate intersection point, of the plurality of candidate intersection points associated with the plurality of road segment pairs, a quality score;

identify a first subset of candidate intersection points, of the plurality of candidate intersection points, that are assigned a quality score that satisfies a quality score threshold;

identify a second subset of candidate intersection points, of the first subset of candidate intersection points, that are located within a first distance from a first center of the first bounding box that satisfies a first distance threshold; and when a quantity of the second subset of candidate intersection points is zero:
  generate a second bounding box around the first subset of candidate intersection points; and
  if the first center of the first bounding box is included in the second bounding box:
    select a first location of a second center of the second bounding box as the intersection of the first road and the second road, or
  when the first center of the first bounding box is not included in the second bounding box:
    identify a first point from the first subset of candidate intersection points that is closest to the first center of the first bounding box;
    identify a third subset of candidate intersection points, of the first subset of candidate intersection points, that are located within a second distance from the first point that satisfies a second distance threshold;
    generate a third bounding box around the third subset of candidate intersection points; and
    select a second location of a center of the third bounding box as the intersection of the first road and the second road, or when the quantity of the second subset of candidate intersection points is greater than zero:
  generate the second bounding box around the second subset of candidate intersection points, and
  select the first location of the second center of the second bounding box as the intersection of the first road and the second road.

* * * * *